(12) United States Patent
D'Agostino et al.

(10) Patent No.: US 10,165,081 B2
(45) Date of Patent: *Dec. 25, 2018

(54) SYSTEM AND METHOD FOR PROCESSING AN INTERACTION RESPONSE

(71) Applicant: The Toronto-Dominion Bank, Toronto (CA)

(72) Inventors: Dino Paul D'Agostino, Richmond Hill (CA); Rakesh Thomas Jethwa, Toronto (CA); Paul Mon-Wah Chan, Markham (CA); John Jong Suk Lee, Toronto (CA); Dean C. N. Tseretopoulos, Toronto (CA); Sarabjit Singh Walia, Demarest, NJ (US); Gregory Richard Harper, Milton (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/620,632

(22) Filed: Jun. 12, 2017

(65) Prior Publication Data
US 2018/0097910 A1 Apr. 5, 2018

Related U.S. Application Data

(63) Continuation-in-part of application No. 15/282,727, filed on Sep. 30, 2016.

(51) Int. Cl.
*G06F 15/16* (2006.01)
*H04L 29/08* (2006.01)
*G06Q 20/10* (2012.01)

(52) U.S. Cl.
CPC ......... *H04L 67/32* (2013.01); *G06Q 20/1085* (2013.01); *H04L 67/10* (2013.01); *H04L 67/147* (2013.01)

(58) Field of Classification Search
USPC ....... 709/227; 719/328; 707/741; 705/14.53; 715/738
See application file for complete search history.

(56) References Cited

U.S. PATENT DOCUMENTS 9,160,855 B2 * 10/2015 Baranovsky ............ H04M 3/51
9,258,376 B2 * 2/2016 Jensen ..................... H04W 4/20
(Continued)

OTHER PUBLICATIONS

Amazon.com—Contact Us; Apr. 7, 2016; https://www.amazon.com/gp/help/contact-us/general-questions.html?skip=true#b.
(Continued)

*Primary Examiner* — Thanh T Nguyen
(74) *Attorney, Agent, or Firm* — Brett J. Slaney; Blake, Cassels & Graydon LLP

(57) ABSTRACT

A method and system are provided for processing an interaction response of a request service provider. The method includes detecting the interaction response for a first interaction session using a first interaction channel between a request initiator and the request service provider, assigning an identifier to the interaction response, determining a task associated with the interaction response, and obtaining context data of a plurality of other interaction sessions. The plurality of other interaction sessions occurs proximal in time with the first interaction session. The context data is related to activity of the request initiator. The method also includes associating a subset of the context data with the interaction response. The subset of the context data is the context data of the plurality of other interaction sessions that are related to the task. The method also includes modifying the interaction response using the subset of the context data.

18 Claims, 19 Drawing Sheets

(56) References Cited

U.S. PATENT DOCUMENTS

| | | | |
|---|---|---|---|
| 2005/0187901 A1* | 8/2005 | Maritzen | H04L 63/08 |
| 2009/0083768 A1* | 3/2009 | Hatalkar | G05B 15/02 |
| | | | 719/328 |
| 2009/0265236 A1* | 10/2009 | Schultz | G06Q 30/02 |
| | | | 705/14.53 |
| 2010/0057688 A1* | 3/2010 | Anovick | G06Q 10/10 |
| | | | 707/E17.001 |
| 2013/0239006 A1* | 9/2013 | Tolkachev | G06F 17/30864 |
| | | | 715/738 |
| 2014/0244652 A1* | 8/2014 | O'Neil | G06Q 50/01 |
| | | | 707/741 |
| 2014/0245143 A1 | 8/2014 | Saint-Marc | |

OTHER PUBLICATIONS

Amazon.com—Contact Us; Apr. 7, 2016; https://www.amazon.com/gp/help/contact-us/general-questions.html?skip=true.

* cited by examiner

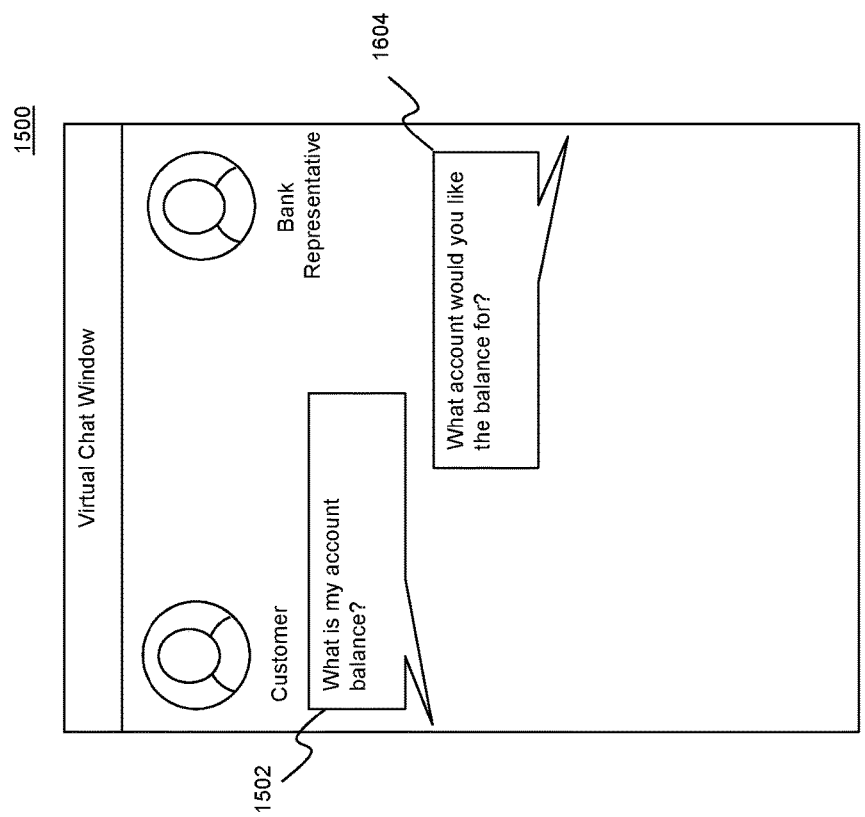

SYSTEM AND METHOD FOR PROCESSING AN INTERACTION RESPONSE

CROSS-REFERENCE TO RELATED APPLICATIONS

The present application is a continuation-in-part of U.S. patent application Ser. No. 15/282,727 filed on Sep. 30, 2016 the content of which is incorporated herein by reference.

TECHNICAL FIELD

The following relates generally to processing an interaction response.

BACKGROUND

Traditionally, accessing a service was often limited to a single interaction channel. For example, a user wishing to conduct banking services can visit a branch and conduct the banking services with a customer service representative in-person. In recent years, the same or similar services have been offered through multiple interaction channels. For example, banking services can also be conducted through an automatic teller machine (ATM), an automated telephone service, voice call with a customer service representative, a mobile application or a website. Similarly, merchants, service providers and other businesses often provide a choice of interaction channels for accessing services, for increasing coverage and/or for the convenience of its users and customers. However, as the number of interaction channels increases, it can become more difficult to provide the user with an integrated and seamless user experience.

BRIEF DESCRIPTION OF THE DRAWINGS

Embodiments will now be described by way of example only with reference to the appended drawings wherein:

FIG. 16 is another example of a graphical user interface of a virtual chat session.

DETAILED DESCRIPTION

Figure 1:
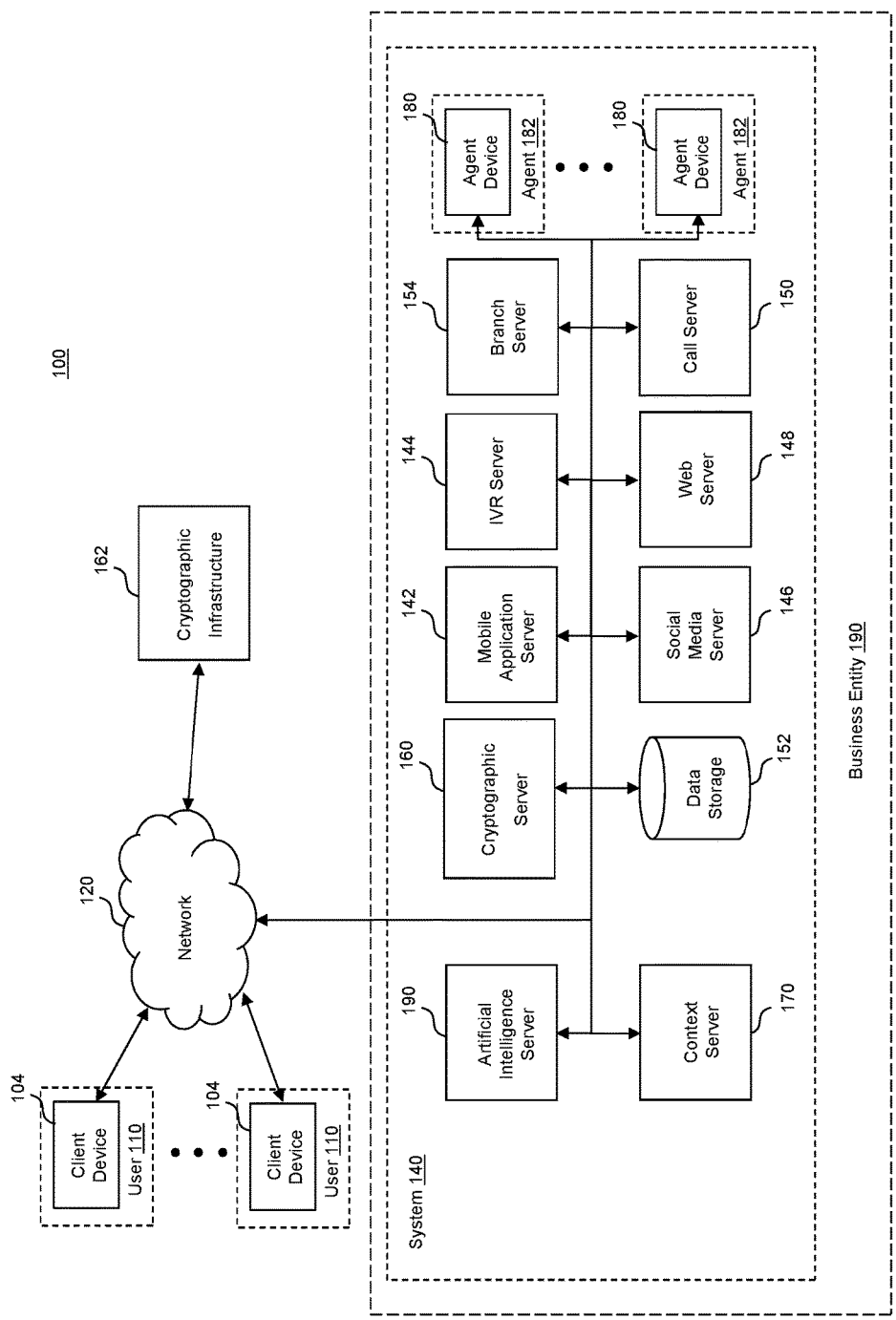
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practised without these specific details. In other instances, well-known methods, procedures and components have not been described in detail so as not to obscure the example embodiments described herein. Also, the description is not to be considered as limiting the scope of the example embodiments described herein.

Services are often provided through multiple interaction channels, such as physical locations, telephone communications, mobile applications, websites, instant messaging/web chats, and social media. A user may access a service using one or more interaction channels at a time, or may switch between different interaction channels. For example, a user may try to carry out a task through a website only to encounter difficulty, prompting the user to call the help line to reach a customer service representative. The task may then be carried out on the website with the guidance of the customer service representative over the phone, or the task may be completed over the phone with the customer service representative.

However, different interaction channels may be implemented in silos and may not have access to the history of user activity performed in another interaction channel. This can result in the user having to repeat steps or provide information that was previously provided in a different interaction channel, which can be frustrating and time consuming for the user. Similarly, this can also result in the service provider providing the same or similar information already provided in a different interaction channel, which may no longer be needed by the user or may not be current in view of other interaction sessions that have recently taken place or are simultaneously taking place. Even with access to the history of user activity from multiple interaction channels, it can be difficult for a service provider to identify the user history that is relevant to a particular interaction session taking place. Such information may include vast amounts of data that may be difficult to review and process in near real-time that is required to provide a responsive interactive experience.

Certain example systems and methods described herein are able to use context data of other interaction sessions to process an interaction request for a new interaction session. In one aspect, there is provided a device for processing an interaction request. The device includes a processor and memory. The memory stores computer executable instructions that when executed by the processor cause the processor to detect the interaction request for a first interaction session using a first interaction channel between a request initiator and a request service provider, assign an identifier to the interaction request, determine a task associated with the interaction request, and obtain context data of a plurality of other interaction sessions associated with the identifier. The plurality of other interaction sessions occurs proximal in time with the first interaction session. The context data is related to activity of the request initiator. The memory also stores computer executable instructions that when executed by the processor cause the processor to associate a subset of the context data with the interaction request. The subset of the context data is the context data of the plurality of other interaction sessions that are related to the task. The memory also stores computer executable instructions that when executed by the processor cause the processor to facilitate the first interaction session using the subset of the context data.

In another aspect, there is provided a method of processing an interaction request. The method includes detecting the interaction request for a first interaction session using a first interaction channel between a request initiator and a request service provider, assigning an identifier to the interaction request, determining a task associated with the interaction request, and obtaining context data of a plurality of other interaction sessions associated with the identifier. The plurality of other interaction sessions occurs proximal in time with the first interaction session. The context data is related to activity of the request initiator. The method also includes associating a subset of the context data with the interaction request. The subset of the context data is the context data of the plurality of other interaction sessions that are related to the task. The method also includes facilitating the first interaction session using the subset of the context data.

In another aspect, there is provided non-transitory computer readable medium for processing an interaction request. The computer readable medium includes computer executable instructions for detecting the interaction request for a first interaction session using a first interaction channel between a request initiator and a request service provider, assigning an identifier to the interaction request, determining a task associated with the interaction request, and obtaining context data of a plurality of other interaction sessions associated with the identifier. The plurality of other interaction sessions occurs proximal in time with the first interaction session. The context data is related to activity of the request initiator. The computer readable medium also includes computer executable instructions for associating a subset of the context data with the interaction request. The subset of the context data is the context data of the plurality of other interaction sessions that are related to the task. The computer readable medium also includes computer executable instructions for facilitating the first interaction session using the subset of the context data.

In certain example embodiments, facilitating the first interaction session may include providing the subset of the context data during the first interaction session for use by the request service provider and/or providing authentication information for use by the request service provider to bypass performance of a first authentication operation in the first interaction session.

Certain example systems and methods described herein are able to use context data of other interaction sessions to process an interaction response for use in an interaction session. In one aspect, there is provided a device for processing an interaction response of a request service provider. The device includes a processor and memory. The memory stores computer executable instructions that when executed by the processor cause the processor to detect the interaction response for a first interaction session using a first interaction channel between a request initiator and the request service provider, assign an identifier to the interaction response, determine a task associated with the interaction response, and obtain context data of a plurality of other interaction sessions associated with the identifier. The plurality of other interaction sessions occurs proximal in time with the first interaction session. The context data is related to activity of the request initiator. The memory also stores computer executable instructions that when executed by the processor cause the processor to associate a subset of the context data with the interaction response. The subset of the context data is the context data of the plurality of other interaction sessions that are related to the task. The memory also stores computer executable instructions that when executed by the processor cause the processor to modify the interaction response using the subset of the context data.

In another aspect, there is provided a method of processing an interaction response of a request service provider. The method includes detecting the interaction response for a first interaction session using a first interaction channel between a request initiator and the request service provider, assigning an identifier to the interaction response, determining a task associated with the interaction response, and obtaining context data of a plurality of other interaction sessions associated with the identifier. The plurality of other interaction sessions occurs proximal in time with the first interaction session. The context data is related to activity of the request initiator. The method also includes associating a subset of the context data with the interaction response. The subset of the context data is the context data of the plurality of other interaction sessions that are related to the task. The method also includes modifying the interaction response using the subset of the context data.

In another aspect, there is provided non-transitory computer readable medium for processing an interaction response of a request service provider. The computer readable medium includes computer executable instructions for detecting the interaction response for a first interaction session using a first interaction channel between a request initiator and the request service provider, assigning an identifier to the interaction response, determining a task associated with the interaction response, and obtaining context data of a plurality of other interaction sessions associated with the identifier. The plurality of other interaction sessions occurs proximal in time with the first interaction session. The context data is related to activity of the request initiator. The computer readable medium also includes computer executable instructions for associating a subset of the context data with the interaction response. The subset of the context data is the context data of the plurality of other interaction sessions that are related to the task. The computer readable medium also includes computer executable instructions for modifying the interaction response using the subset of the context data.

In certain example embodiments, modifying the interaction response includes translating the interaction response for transmission in one of the plurality of other interaction sessions that uses an interaction channel different from the first interaction channel, or for transmission in a new interaction session that uses an interaction channel different from the first interaction channel.

In certain example embodiments, modifying the interaction response includes updating data of the interaction response to be consistent with other data transmitted to the request initiator in one of the plurality of other interaction sessions.

Certain example systems and methods described herein are able to use context data of other interaction sessions to process an interaction request in an interaction session. In one aspect, there is provided a device for processing an interaction request. The device includes a processor and memory. The memory stores computer executable instructions that when executed by the processor cause the processor to detect the interaction request in a first interaction session using a first interaction channel between a request initiator and a request service provider, assign an identifier to the interaction request, determine a task associated with the interaction request, and obtain context data of a plurality of other interaction sessions associated with the identifier. The plurality of other interaction sessions occurs proximal in time with the first interaction session. The context data is related to activity of the request initiator. The memory also stores computer executable instructions that when executed by the processor cause the processor to associate a subset of the context data with the interaction request. The subset of the context data is the context data of the plurality of other interaction sessions that are related to the task. The memory also stores computer executable instructions that when executed by the processor cause the processor to generate at least one interaction response in response to the task using the subset of the context data.

In another aspect, there is provided a method of processing an interaction request. The method includes detecting the interaction request in a first interaction session using a first interaction channel between a request initiator and a request service provider, assigning an identifier to the interaction request, determining a task associated with the interaction request, and obtaining context data of a plurality of other interaction sessions associated with the identifier. The plurality of other interaction sessions occurs proximal in time with the first interaction session. The context data is related to activity of the request initiator. The method also includes associating a subset of the context data with the interaction request. The subset of the context data is the context data of the plurality of other interaction sessions that are related to the task. The method also includes generating at least one interaction response in response to the task using the subset of the context data.

In another aspect, there is provided non-transitory computer readable medium for processing an interaction request. The computer readable medium includes computer executable instructions for detecting the interaction request in a first interaction session using a first interaction channel between a request initiator and a request service provider, assigning an identifier to the interaction request, determining a task associated with the interaction request, and obtaining context data of a plurality of other interaction sessions associated with the identifier. The plurality of other interaction sessions occurs proximal in time with the first interaction session. The context data is related to activity of the request initiator. The computer readable medium also includes computer executable instructions for associating a subset of the context data with the interaction request. The subset of the context data is the context data of the plurality of other interaction sessions that are related to the task. The computer readable medium also includes computer executable instructions for generating at least one interaction response in response to the task using the subset of the context data.

In certain example embodiments, a plurality of interaction responses are generated and provided to the request service provider for use in the first interaction session. In certain example embodiments, the interaction responses generated are sent to the request initiator in the first interaction session.

In certain example embodiments, the task and the subset of the context data are associated with the interaction responses generated, and the association is stored in memory for use in determining a subsequent interaction response. A subsequent interaction response may be generated by detecting that the task and the subset of the context data are associated with an interaction response, and generating the subsequent interaction response based on the associated interaction response.

In certain example embodiments, the context data of the plurality of other interaction sessions may be assigned weighting values based on interaction channel type and the subset of the context data includes the context data of the plurality of other interaction sessions satisfying a weighting threshold value.

In certain example embodiments, the plurality of other interaction sessions may include other interaction sessions initiated within a predetermined time preceding the interaction request and/or active at a time of detecting the interaction request. Each of the plurality of other interaction sessions and the first interaction session may use different types of interaction channels and the context data of each of the plurality of other interaction sessions may include an identifier of the type of interaction channel used.

In certain example embodiments, the context data of the plurality of other interaction sessions may be ranked based on relevance to the task and the subset of the context data is associated with the interaction request in order of the ranking.

FIG. 1 illustrates an exemplary computing environment 100. In one aspect, computing environment 100 may include one or more client devices 104, a system 140, and a communication network 120 connecting one or more of the components of environment 100.

Client devices 104 may be associated with one or more users 110. Users 110 can include both real and/or virtual/automated entities. The computing environment 100 may include multiple client devices 104, each associated with a separate user 110 or with one or more users 110. In certain embodiments, user 110 may operate client device 104 such that client device 104 performs one or more processes consistent with the disclosed embodiments. For example, user 110 may use client device 104 to perform a transaction involving one or more accounts associated with user 110 and/or other users that are provided, maintained, managed, and/or processed by system 140. In certain aspects, client device 104 can include, but is not limited to, a personal computer, a laptop computer, a tablet computer, a notebook computer, a hand-held computer, a personal digital assistant, a portable navigation device, a mobile phone, a wearable device, a gaming device, an embedded device, a smart phone, third party portals, an automated teller machine (ATM), and any additional or alternate computing device, and may be operable to transmit and receive data across communication network 120.

Communication network 120 may include a telephone network, cellular, and/or data communication network to connect different types of client device 104. For example, the communication network 120 may include a private or public switched telephone network (PSTN), mobile network (e.g., code division multiple access (CDMA) network, global system for mobile communications (GSM) network, and/or any 3G or 4G wireless carrier network, etc.), WiFi or other similar wireless network, and a private and/or public wide area network (e.g., the Internet).

In one embodiment, system 140 may be one or more computer systems configured to process and store information and execute software instructions to perform one or more processes consistent with the disclosed embodiments. In certain embodiments, although not required, system 140 may be associated with one or more business entities, such as business entity 190. In certain embodiments, business entity 190 may be any type of business entity. For example, system 140 may be a system associated with a commercial bank, a retailer, or some other type of business.

While certain aspects of the disclosed embodiments are described in connection with business entity 190 as a financial institution (e.g., commercial bank) that provides financial services accounts to users 110 and processes financial transactions associated with those financial service accounts, the disclosed embodiments are not so limited. In other embodiments, system 140 may be associated with a business entity 190 that provides customer or user accounts, such as retailers, merchants and other consumer and/or commercial service providers.

The system 140 may include one or more servers to facilitate or carry out a service requested by user 110 via the client device 104. Exemplary servers include a mobile application server 142, an interactive voice response (IVR) server 144, a social media server 146, a web server 148, and a call server 150. In the example of a commercial bank business entity 190, the system 140 may also include a branch server 154. The servers can be used to implement different interaction channels provided by business entity 190. The system 140 may also include a cryptographic server 160 for performing cryptographic operations and providing cryptographic services. The cryptographic server 160 can also be configured to communicate and operate with a cryptographic infrastructure 162. The system 140 may also include one or more data storages for storing and providing data for use in such services, such as data storage 152. System 140 also includes a context server 170, which as discussed below, can be used to associate context data of other interaction sessions with an interaction request from, or an interaction response to, a client device 104. System 140 may also include one or more agent devices 180 for use by one or more agents 182 (e.g., workstations operated by live agents at a contact centre). System 140 may also include an artificial intelligence server 190 to automatically perform operations, make selections, and generate interaction messages as described herein.

Mobile application server 142 supports interactions with a mobile application installed on client device 104 to provide a mobile interaction channel. Mobile application server 142 can access other resources of system 140 to carry out requests made by, and to provide content and data to, the mobile application on client device 104. In an example embodiment, mobile application server 142 supports a mobile banking application to provide a mobile banking interaction channel.

IVR server 144 supports interactions over a telephone network that uses voice and/or keypad inputs received from client device 104. The IVR server 144 can access other resources of system 140 to carry out requests made by, and to provide response to, user 110 during the call. In an example embodiment, IVR server 144 supports an automated telephone service to provide an automated telephone banking interaction channel. The IVR server may also interact with call server 150 to route the telephone call to an agent 182 via agent device 80. In an example embodiment, agent device 180 can be a workstation having telephony capabilities operated by a live agent 182. In some embodiments, IVR server 144 may be absent from system 140, and calls from client device 110 over the telephone network may be directed to the call server 150 directly.

Social media server 146 supports interaction in the form of one or more social media platforms, such as email, chat, videoconferencing, text-messaging, etc. In an example embodiment, social media server 146 communicates with one or more applications running on agent device 180 to enable an agent 182 to interact with user 110 via a social media platform. In an example embodiment, social media server 146 supports online chat functionality to provide an online chat interaction channel on the website of business entity 190 or a third-party social media website.

Web server 148 supports interactions using a website accessed by an internet browser running on the client device 104. A user 110 may access webpages regarding a company's products or services. The webserver 148 may carry authentication protocols to support secured webpages. In an example embodiment, web server 148 supports a secured web portal to provide an online banking interaction channel.

In the example of a commercial bank business entity 190, branch server 154 supports the computer systems (e.g., ATMs, workstations of branch tellers) located at branch locations. In this example embodiment, the agent device 180 can include ATMs and workstations operated by branch tellers, and branch server 154 supports an in-person banking interaction channel.

Figure 2:
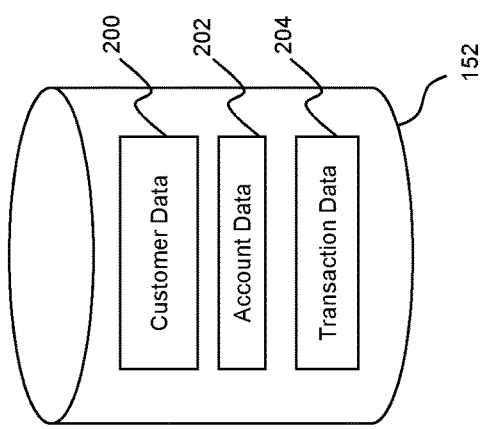
FIG. 2 is a block diagram of example data components of a data storage.

Data storage 152 may be provided using one or more data storage devices configured to store information consistent with the disclosed embodiments. In the example embodiment shown in FIG. 2, data storage 152 may include customer data 200, account data 202, and transaction data 204. In one aspect, customer data 200 may include one or more data records uniquely identifying one or more users 110 of business entity 190 associated with system 140. By way of example, a customer of a financial institution (e.g., business entity 190) may access a web page associated with system 140 (e.g., through web server 148), and subsequently register for online banking services and provide data. The data may be linked to the customer and stored within customer data 200.

In certain aspects, customer data 200 may include personal information associated with a user 110 (e.g., a name, home address, or date of birth), demographic information (e.g., educational level, income level), government-issued identifiers (e.g., driver's license numbers or Social Security numbers), employment information (e.g., employer name or address), and/or contact information (e.g., e-mail addresses, home numbers, work numbers, or mobile numbers). Other types of customer information may be stored and used.

Customer data 200 may include client device identification information identifying one or more client devices 104 registered to user 110. In one embodiment, the user may provide the client device identification information (e.g., a mobile telephone number provided by the user when registering for online banking services). Alternatively, system 140 may be configured to execute processes that automatically collect client device identification information (e.g., collecting an Internet Protocol (IP) address associated with the customer's smartphone by web server 148).

In an example embodiment, customer data 200 may include geographic position data associated with user 110 and/or at least one of client devices 104 registered to user 110. For instance, the geographic position data may identify a current geographic position of user 110 and/or client devices 104, and additionally or alternatively, one or more prior geographic positions of user 110 and/or client devices 104. In certain aspects, system 140 may obtain a portion of the geographic position data from client device 104 across communication network 120. By way of example, client device 104 may include a global position system (e.g., a GPS) that tracks a current geographic position of client device 104, and client device 104 may transmit geographic position data indicative of the current geographic position of client device 104 to system 140 across communication network 120. For instance, client device 104 may append the geographic position data to data transmitted to system 140 in response to a completed transaction, and/or a required update to system 140. In other instances, client device 104 may transmit the geographic position data to a third-party system (e.g., a mobile telecommunications provider), and system 140 may obtain portions of the geographic position data from the third-party system across network 140 through an appropriate application programming interface (API). Upon receipt of the geographic position data from client device 104 and/or the third-party system, system 140 may be configured to format and store the received positional information within data storage 152 (e.g., as portions of customer data 200).

In certain aspects, account data 202 may include information identifying one or more accounts of customers of a financial institution (e.g., business entity 190) associated with system 140. In one embodiment, account identification information may include financial service account information. For example, such service account information may include a checking account, a savings account, a revolving credit line, an account linked to a credit or debit card, a brokerage account, a wealth account, an investment account, and any additional or alternate account provided or supported by the issuing bank. In other embodiments, account data 202 may include information identifying investment portfolios held by one or more customers of the financial institution (e.g., positions in one or more securities held by the customers). Information within account data 202 may also identify, for a single customer, one or more accounts associated with the customer and account data corresponding to the accounts (e.g., account, expiration date information, and/or card security codes, account balance information, and/or credit limit information).

In other aspects, account data 202 may include account information associated with nonfinancial service accounts, such as online customer accounts for retailers, merchants or other services or activities.

Transaction data 204 may include information identifying one or more transactions involving one or more customers or accounts of business entity 190 associated with system 140. In one embodiment, such transactions may include, but are not limited to, purchase transactions (e.g., purchases of goods and/or services from electronic or physical retailers), financial service transactions (e.g., fund transfers), bill payment transactions (e.g., electronic bill payment transactions), financial instrument or security transactions (e.g., purchases of securities), deposits or withdrawals of funds, or applications for credit from the financial institution or other entity.

Referring back to FIG. 1, system 140 may also include a cryptographic server 160 for performing cryptographic operations and providing cryptographic services (e.g., authentication (via digital signatures), data protection (via encryption), etc.) to provide a secure interaction channel and interaction session, etc. The cryptographic server 160 can also be configured to communicate and operate with a cryptographic infrastructure 162, such as a public key infrastructure (PKI), certificate authority (CA), certificate revocation service, signing authority, key server, etc. The cryptographic server 160 and cryptographic infrastructure 162 can be used to protect the various data communications described herein, to secure communication channels therefor, authenticate parties, manage digital certificates for such parties, manage keys (e.g., public and private keys in a PKI), and perform other cryptographic operations that are required or desired for particular applications of the system 140. The cryptographic server 160 may be used to protect the customer data 200, account data 202, and transaction data 204 by way of encryption for data protection, digital signatures or message digests for data integrity, and by using digital certificates to authenticate the identity of the users 110 and client devices 104 with which the system 140 communicates to inhibit data breaches by adversaries. It can be appreciated that various cryptographic mechanisms and protocols can be chosen and implemented to suit the constraints and requirements of the particular deployment of the system 140 as is known in the art.

Figure 3:
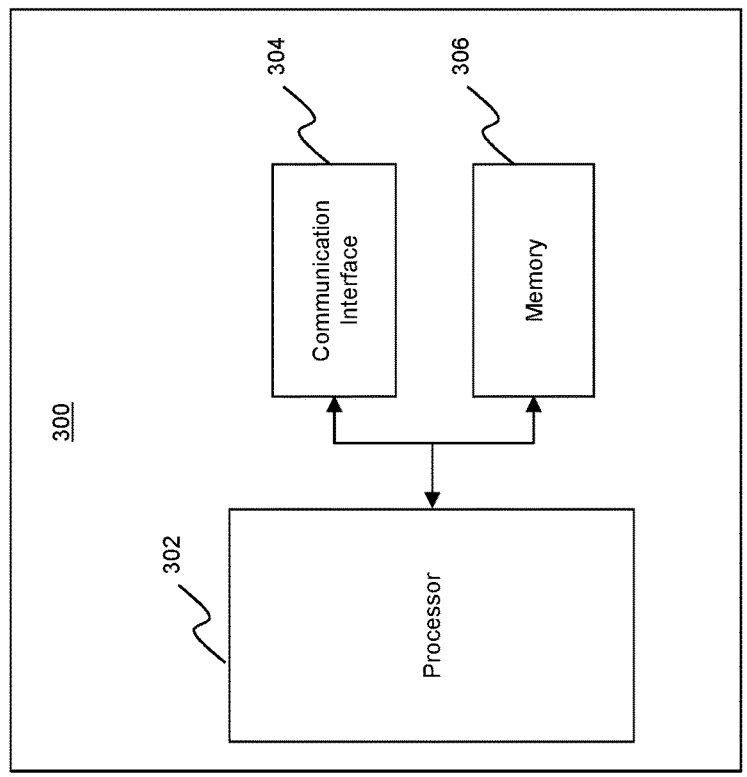
FIG. 3 is a block diagram of an example computing system.

FIG. 3 illustrates an example computer system 300. Computer system 300 may reflect computer systems associated with system 140, mobile application server 142, IVR server 144, social media server 146, web server 148, call server 150, branch server 154, cryptographic server 160, context server 170, artificial intelligence server 190, client device 104 and/or agent device 180.

In certain embodiments, computer system 300 may include one or more processors 302, a communication interface 304, and memory device 306. Communication interface 304 enables the computer system 300 to communicate with one or more other components of computing environment 100, such as client device 104 or system 140 (or one of its components), via a bus or other communication network, such as communication network 120. Memory device 306 can include tangible and non-transitory computer-readable medium having stored therein computer programs, sets of instructions, code, or data to be executed by processor 302.

Figure 4:
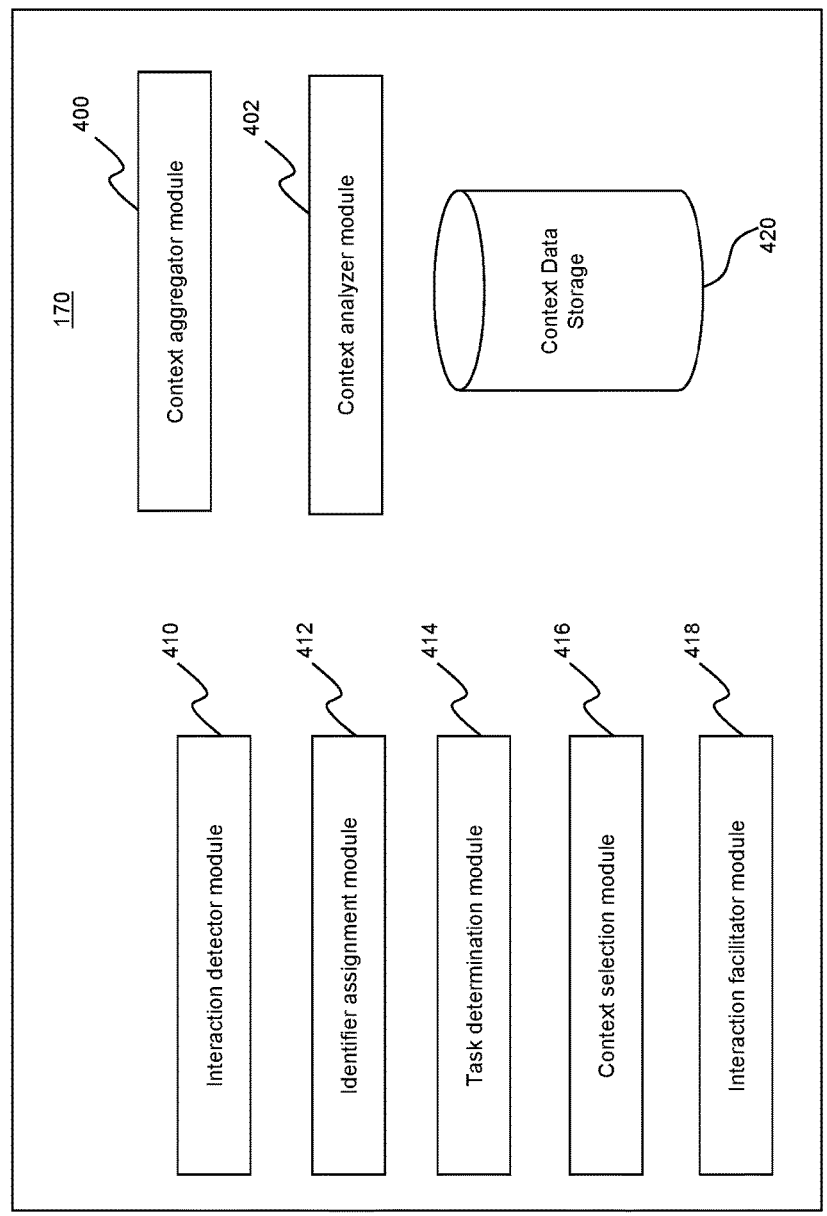
FIG. 4 is a block diagram of an example configuration of a context server.

In FIG. 4, an example configuration of context server 170 is shown. Context server 170 includes a context aggregator module 400, a context analyzer module 402, an interaction detector module 410, an identifier assignment module 412, a task determination module 414, a context selection module 416, and an interaction facilitator module 418.

The context aggregator module 400 receives or determines context data for interaction sessions that have been completed or that are taking place in system 140 for one or more users 110. The context data for an interaction session can include numerous information related to the interaction session, such as the purpose, task and/or subject of an interaction session, the identity of the user 110 and/or client device 104 involved in the interaction session, the type of interaction channel used, the start and finish times/dates of the interaction session, the location of user 110 and/or client device 104, references to other related interaction sessions, other metadata, etc.

In an example embodiment, the context data may be determined by the applicable servers of system 140, agent device 180 and/or agent 182, at the time of performing transactions within the interaction session, and recorded as part of the transaction data 204 stored in data storage 152. In this example embodiment, context aggregator module 400 can request or access such transaction data 204 from data storage 152. A local copy of the context data retrieved from data storage 152 can be stored in context data storage 420 for increased performance of the context server 170.

In an example embodiment, the context aggregator module 400 monitors the communications being sent or received by, or within, system 140 to determine when an interaction session is carried out, and the context aggregator module 400 generates context data associated with such interaction session and stores such context data in context data storage 420.

In this way, the context aggregator module 400 can track and process in parallel multiple interaction sessions concurrently taking place (e.g., all interaction sessions concurrently taking place between a user 110 and system 140). Context aggregator module 400 can generate in parallel context data associated with all such interaction sessions, and make the context data of each interaction session available for use in the other interaction sessions concurrently taking place, as well as for use in future interaction sessions. The context data may be accessed in parallel by multiple interaction sessions and/or when processing multiple interaction requests.

In an example embodiment, the context aggregator module 400 can determine context data for an interaction request (whether or not the interaction session has been established). For example, if the interaction session of the interaction request has not yet been established, certain context data can still be determined, such as the time/date the request is initiated, the identity of the request initiator, the interaction channel of the interaction session being requested, other metadata, etc.

The context data determined by the context aggregator module 400 can be stored and organized in the context data storage 420 as a database that can be queried based on various context data fields, such as details on the purpose, task and/or subject of an interaction session or interaction request or interaction response, the identity of the user 110 and/or client device 104 involved in the interaction session, the type of interaction channel used, the start and finish times/dates of the interaction session, etc. It will be understood that not all fields of context data will be applicable to all interaction sessions, interaction requests or interaction responses.

The context analyzer module 402 analyzes context data stored in the context data storage 420 according to various criteria, the results of which may be used by the task determination module 414 and/or context selection module 416, and examples of which are described in the embodiments and example scenarios herein.

The interaction detector module 410 can detect an interaction request for an interaction session between a request initiator and a request service provider. The interaction detector module 410 can also detect an interaction response of the request service provider during an interaction session with the request initiator. In an example embodiment, each interaction to and from the system 140 is sent to interaction detector module 410 for processing and/or the interaction detector module 410 monitors communications being sent or received by, or within, system 140 to identify interaction requests and responses.

The identifier assignment module 412 assigns an identifier to an interaction request or response.

The task determination module 414 determines a task associated with the interaction request or response. It will be appreciated that a task can represent a specific transaction to be carried out by or for user 110 (e.g., transfer $500 from savings account of user 110 to chequing account of user 110), or it can represent a general subject area among many possible subjects for which the interaction request or response could relate to (e.g., mortgage product of user 110).

The context selection module 416 selects a subset of the context data from the context data available to the context server 170 to associate with the interaction request or response. The subset of the context data can then be used in the requested interaction session after that session is established. In this way, activity history of user 110 relevant to the interaction request or response may be identified for use while irrelevant context data can be ignored.

Interaction facilitator module 418 uses the subset of the context data to facilitate the interaction session requested by the interaction request or to modify the interaction response.

It will be appreciated that context server 170 may be incorporated into a single computer or a single server or service, or alternatively, may be distributed among one or more computing systems 300. In an example embodiment, context server 170 (or a module thereof, such as those shown in FIG. 4 for example) may be implemented as one or more software programs, such as a software application (e.g., a web service) executed by one or more processors included in one of the other servers of system 140, client device 104, agent device 180, or another server or computing system 300.

It will also be appreciated that the context server 170 may not include all modules shown in FIG. 4 and/or the functionality described with respect to each module. For example, in certain example embodiments, the context server 170 may be configured to only process interaction requests such that the applicable modules and functionality to process interaction responses are not provided, or vice versa.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers in system 140, client device 104, or agent device 180, or accessible or connectable thereto. Any application or module herein described may be implemented using computer readable/executable instructions that may be stored or otherwise held by such computer readable media.

Figure 5A:
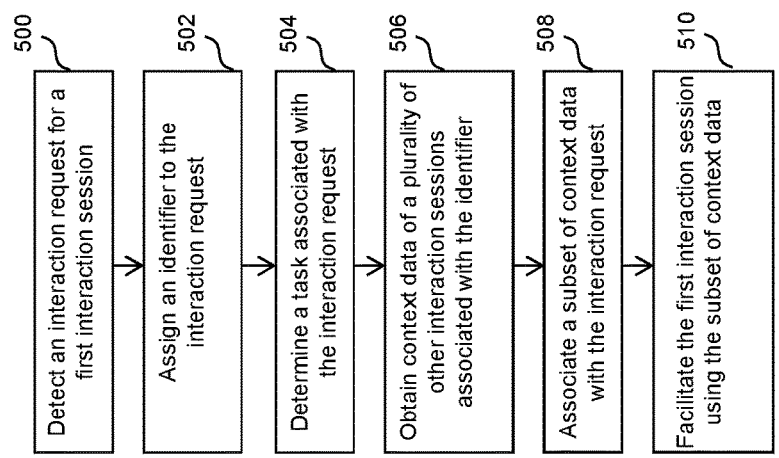
FIG. 5A is a flow diagram of an example of computer executable instructions for processing an interaction request.

Referring to FIG. 5A, an example embodiment of computer executable instructions for processing an interaction request is shown. At block 500, the interaction detector module 410 detects an interaction request for an interaction session using an interaction channel.

At block 502, the identifier assignment module 412 assigns an identifier to the interaction request. In an example embodiment, an identifier unique to user 110 and/or client device 104 can be used. In an example embodiment, the identity of user 110 and/or client device 104 initiating the interaction request, or for which the request relates, may be inserted in the interaction request itself. In an example embodiment, the identity of user 110 and/or client device 104 can be determined by system 140 upon receiving the interaction request (e.g., through telephone number caller identification technology used in the IVR server 144 or call server 150, or collecting an IP address associated with client device 104).

At block 504, the task determination module 414 determines a task associated with the interaction request. In an example embodiment, the context analyzer module 402 analyzes a set of context data related to the interaction request to generate statistical information related thereto. Based on the degree of similarity in the context data of the interaction request and historical context data of other interaction sessions, the statistical information may include probabilities that the interaction request is associated with the same task of the historical context data. In this example embodiment, the task determination module 414 can select the task that has the highest probability of occurring that has similar context data values as the interaction request. For example, a user 110 may prefer a specific interaction channel to perform specific tasks and thus, the interaction channel may be indicative of the task associated with the interaction request (e.g., a user may tend to use the mobile application channel for completing routine low-value banking tasks, but tend to use the online banking channel or telephone banking channel for less frequent high-value tasks).

In an example embodiment, the context analyzer module 402 only analyzes the set of context data associated with interaction sessions that are active at the time of detecting the interaction request. Active interaction sessions may be more indicative of the task or subject area currently of interest to the request initiator. The context analyzer module 402 can identify any common properties among the context data of active interaction sessions to infer a task associated with the interaction request being processed. In another example embodiment, the context analyzer module 402 may limit the set of context data to recent context data (i.e., context data associated with interaction sessions that are active or ended within the last hour, day, week, month, or other predetermined period of time).

At block 506, the context server 170 obtains context data (e.g., from the context data storage 420) of other interaction sessions associated with the identifier that is related to the activity of user 110. The other interaction sessions can include previous interaction sessions that have ended and/or active interaction sessions that are taking place at the time the interaction request is detected.

At block 508 the context selection module 416 selects a subset of the context data from the context data available to the context server 170 (e.g., stored in context data storage 420) and associates such context data with the interaction request. In an example embodiment, the subset of the context data associated with the interaction request may be limited to active interaction sessions or to context data of recent interaction sessions. However, in other example embodiments, the time window used by the context selection module 416 to determine the subset of the context data to associate with the interaction request may be different from the time window used by the task determination module 414 to determine the task associated with the interaction request. For example, the task determination module 414 may determine, from analyzing active interaction sessions only, that the interaction request task relates to a mortgage product of user 110. The context selection module 416 may then select the subset of the context data as all context data across all interaction channels related to the mortgage term, as the lifespan of a mortgage product can be relatively long and older activity may still be relevant.

In an example embodiment, the context selection module 416 may assign weighting values to the context data of the plurality of other interaction sessions based on relevance, similarities or differences to the interaction request or response, task, interaction channel type, or interaction session being requested. Selection of the subset of the context data can incorporate the weighting values, such as only selecting context data of other interaction sessions that satisfies a weighting threshold value.

At block 510, the interaction facilitator module 418 uses the subset of the context data to facilitate the interaction session requested by the interaction request. In an example embodiment, the interaction facilitator module 418 facilitates the interaction session by providing the subset of the context data to the request service provider. For example, if the interaction request is for a live agent telephone session, the interaction facilitator module can send the subset of the context data to the agent device 180 for display to the agent 182 servicing the telephone session (e.g., via a monitor or other display device that is part of or accessible to the agent device 180).

In an example embodiment, if the interaction session requested is a mobile session, the interaction facilitator module 418 can use the subset of the context data to determine services that may be of interest to user 110 that are related to the task associated with the interaction request. Interaction facilitator module 418 then sends the services of interest to mobile application server 142, which can then cause the mobile application running on client device 104 to display a set of suggested links in the graphical user interface of the mobile application (e.g., under a "suggested links" section of the display screen or as an initial landing page upon logging into the mobile application). It will be appreciated that, having identified a relevant subset of the context data of other interaction sessions, there can be other ways to use such subset of the context data to improve the user experience of the interaction session being requested.

Figure 5B:
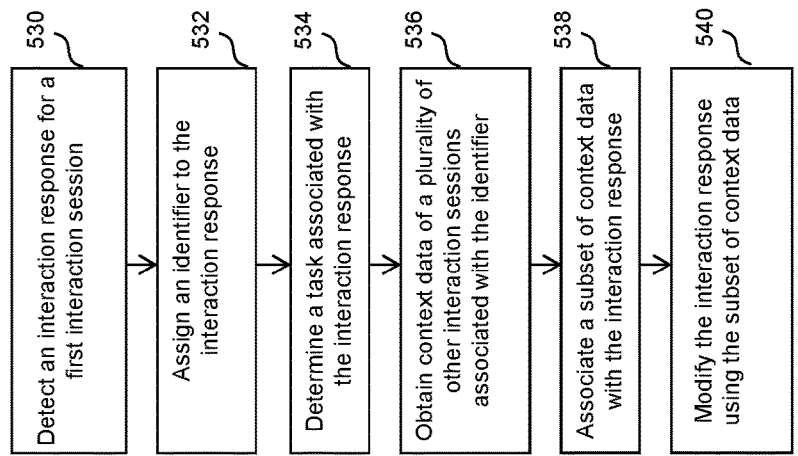
FIG. 5B is a flow diagram of an example of computer executable instructions for processing an interaction response.

Referring to FIG. 5B, an example embodiment of computer executable instructions for processing an interaction response is shown. At block 530, the interaction detector module 410 detects an interaction response for an interaction session using an interaction channel.

At block 532, the identifier assignment module 412 assigns an identifier to the interaction response. In an example embodiment, an identifier unique to user 110 and/or client device 104 that the interaction response is intended for can be used. In an example embodiment, the identity of user 110 and/or client device 104 intended to receive the interaction response, or for which the response relates, may be inserted in the interaction response itself. In an example embodiment, the identity of user 110 and/or client device 104 can be determined by system 140 by identifying the source of the interaction request for which the interaction response is responding to.

At block 534, the task determination module 414 determines a task associated with the interaction response. In an example embodiment, the context analyzer module 402 analyzes a set of context data related to the interaction response to generate statistical information related thereto. Based on the degree of similarity in the context data of the interaction response and historical context data of other interaction sessions, the statistical information may include probabilities that the interaction response is associated with the same task of the historical context data. In this example embodiment, the task determination module 414 can select the task that has the highest probability of occurring that has similar context data values as the interaction response. For example, a user 110 may prefer a specific interaction channel to perform specific tasks and thus, the interaction channel may be indicative of the task associated with the interaction response (e.g., a user may tend to use the mobile application channel for completing routine low-value banking tasks, but tend to use the online banking channel or telephone banking channel for less frequent high-value tasks).

In an example embodiment, the context analyzer module 402 only analyzes the set of context data associated with interaction sessions that are active at the time of detecting the interaction response. Active interaction sessions may be more indicative of the task or subject area currently of interest to the request initiator. The context analyzer module 402 can identify any common properties among the context data of active interaction sessions to infer a task associated with the interaction response being processed. In another example embodiment, the context analyzer module 402 may limit the set of context data to recent context data (i.e., context data associated with interaction sessions that are active or ended within the last hour, day, week, month, or other predetermined period of time).

At block 536, the context server 170 obtains context data (e.g., from the context data storage 420) of other interaction sessions associated with the identifier that is related to the activity of user 110. The other interaction sessions can include previous interaction sessions that have ended and/or active interaction sessions that are taking place at the time the interaction response is detected.

At block 538 the context selection module 416 selects a subset of the context data from the context data available to the context server 170 (e.g., stored in context data storage 420) and associates such context data with the interaction response. In an example embodiment, the subset of the context data associated with the interaction response may be limited to active interaction sessions or to context data of recent interaction sessions. However, in other example embodiments, the time window used by the context selection module 416 to determine the subset of the context data to associate with the interaction response may be different from the time window used by the task determination module 414 to determine the task associated with the interaction response. For example, the task determination module 414 may determine, from analyzing active interaction sessions only, that the interaction response task relates to a mortgage product of user 110. The context selection module 416 may then select the subset of the context data as all context data across all interaction channels related to the mortgage term, as the lifespan of a mortgage product can be relatively long and older activity may still be relevant.

At block 540, the interaction facilitator module 418 uses the subset of the context data to modify the interaction response. In an example embodiment, the interaction facilitator module 418 translates the interaction response initially intended for transmission in the current interaction session to another interaction session that may be taking place concurrently with user 110 using a different interaction channel, or to a new interaction session to be initiated by the request service provider.

For example, an online web portal session between web server 148 and a workstation of a user 110 and a mobile application session between mobile application server 142 and a mobile device of the same user 110 may be concurrently active. An interaction response may be sent from web server 148 as part of an online web portal session that is detected or received by the context server 170. In processing the interaction response, interaction facilitator module 418 may determine from the context data of the mobile application session that user 110 has since left the location of the workstation (e.g., using GPS data of the mobile device), such that the interaction facilitator module 418 translates the interaction response sent from web server 148 as an online web portal session message (for transmission to the workstation) to a mobile application session message for transmission to the mobile device, in order to effectively and timely reach user 110.

In an example embodiment, the interaction facilitator module 418 may translate the interaction response to a message for transmission in a new interaction session (using a different interaction channel) not yet established. For example, the interaction response of an online web portal session or other electronic-based session may be translated to an IVR message and telephone call to user 110 in an attempt to reach user 110 immediately.

In an example embodiment, the interaction facilitator module 418 can use the subset of the context data to update data of the interaction response to be consistent with other data previously transmitted in other interaction sessions. For example, the interaction response may include account data 202 retrieved from data storage 152. However, an event in another interaction session may have recently occurred that affects the value of the account data 202 but has not yet been updated and stored in data storage 152. The interaction facilitator module 418 can update the interaction response based on the context data of other interaction sessions that affected the account data 202 such that up-to-date data is included in the interaction response to provide real-time information to user 110.

In an example embodiment, the interaction facilitator module 418 can update interaction responses to ensure that consistent data and other information are provided across multiple interaction session that use different interaction channels. For example, a business entity 190 may want to implement a marketing campaign across different interaction channels but ensure that a customer is offered the same product, discount, benefit, etc. through its web portal, social media platforms, mobile application, telephone calls and in-person visits. In another example, the business entity 190 may wish to promote and encourage use of a specific interaction channel over others by offering certain products and greater discounts, benefits, etc. only through specific interaction channels. The interaction facilitator module 418 can adjust the interaction response data based on the offers already provided to user 110, as set out in the subset of the context data associated with the interaction response.

In an example embodiment, the interaction facilitator module 418 can use the subset of the context data to confirm that an active interaction session with the client device 104 has been authenticated, and then use the active interaction session to authenticate an interaction session being requested. In this way, the requested interaction session inherits authentication properties from the existing authenticated active interaction session, and interaction responses related to certain authentication procedures of the interaction session being requested can be avoided or reduced. For example, an internet banking session often requires the user 110 to enter a customer number and online banking password. A telephone banking session often requires the user 110 to answer multiple security questions (e.g., customer number, mother's maiden name, details of recent transactions, social insurance or other government identification number, etc.). In an example interaction session, user 110 may enter the customer number and password to securely access the online banking website to conduct an online banking session with the web server 148. During the online banking session, user 110 places a call to the telephone banking number. The IVR server 144 may then generate a standard interaction response requiring the caller to respond to various security questions which is detected by or sent to the context server 170. The context server 170 uses the subset of the context data to detect that there is already an active and secure online banking session with the user 110 and thus modifies the interaction response to use the online banking channel to confirm that it is user 110 that is making the call through the telephone banking channel. For example, the interaction response can be modified to authenticate the caller as user 110 by causing the web server 148 to display a window prompt in the online banking session accessed using user 110's internet browser that must be clicked in order to confirm that the user 110 of the online banking session (which has already been authenticated) is also the caller of the telephone banking session. In this way, authentication in the online banking channel is inherited in the telephone banking channel. In another example, the interaction facilitator module 418 may modify the interaction response from the IVR server 144 to cause the web server 148 to display a temporary code that the user 110 is prompted to enter in the telephone banking session as an alternative to the standard security questions. User 110 may find such authentication easier and less onerous as the temporary code is presented to the user 110 on the online banking session rather than requiring the user 110 to memorize responses to a variety of security questions, which the user 110 may forget and find frustrating.

It will be appreciated that the description of blocks 502, 504, 506 and 508 may apply in a similar manner to blocks 532, 534, 536 and 538, respectively.

Figure 6A:
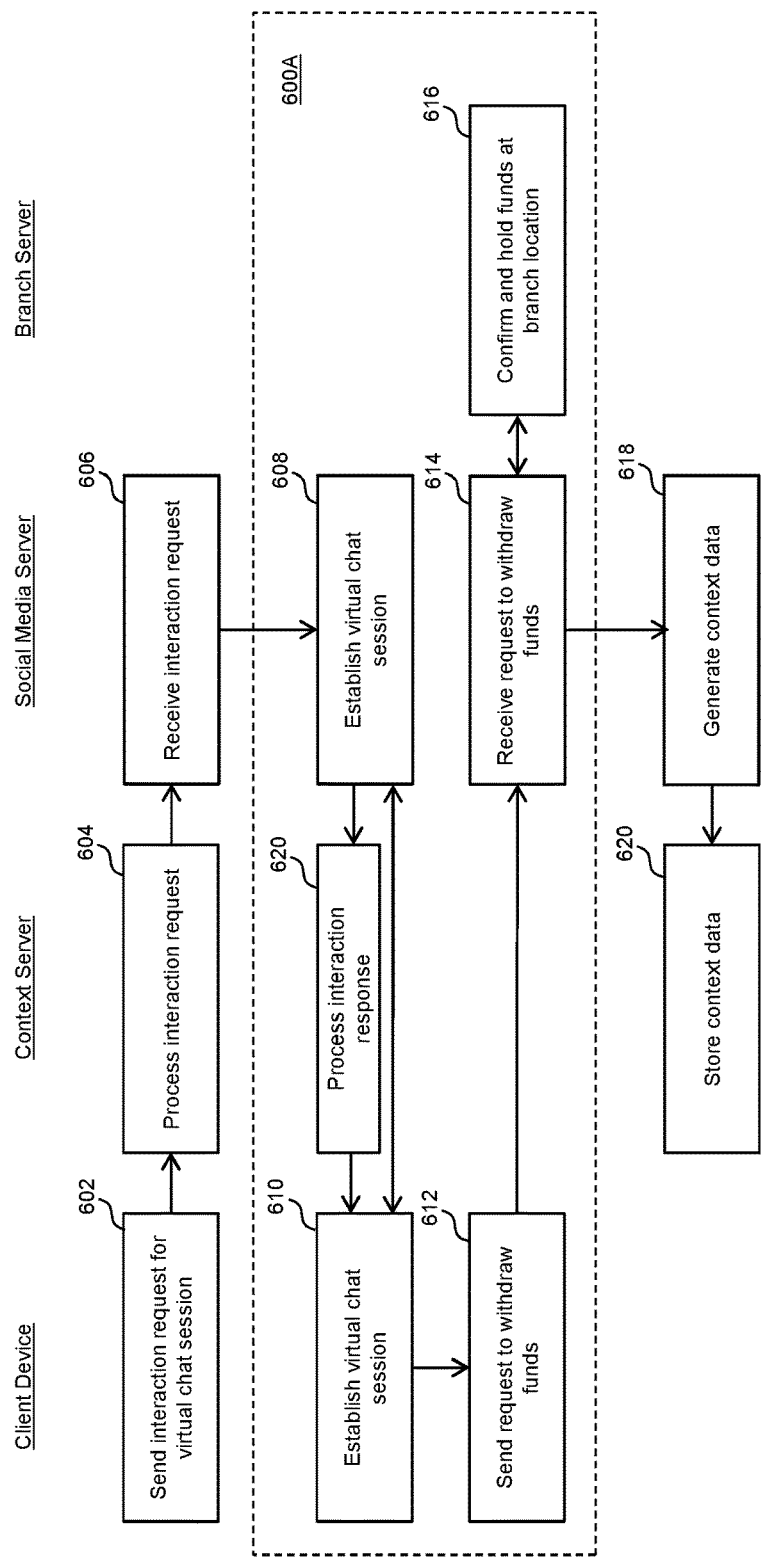
FIGS. 6A-6C are flow diagrams of examples of computer executable instructions for interaction sessions to perform an example task.
Figure 6B:
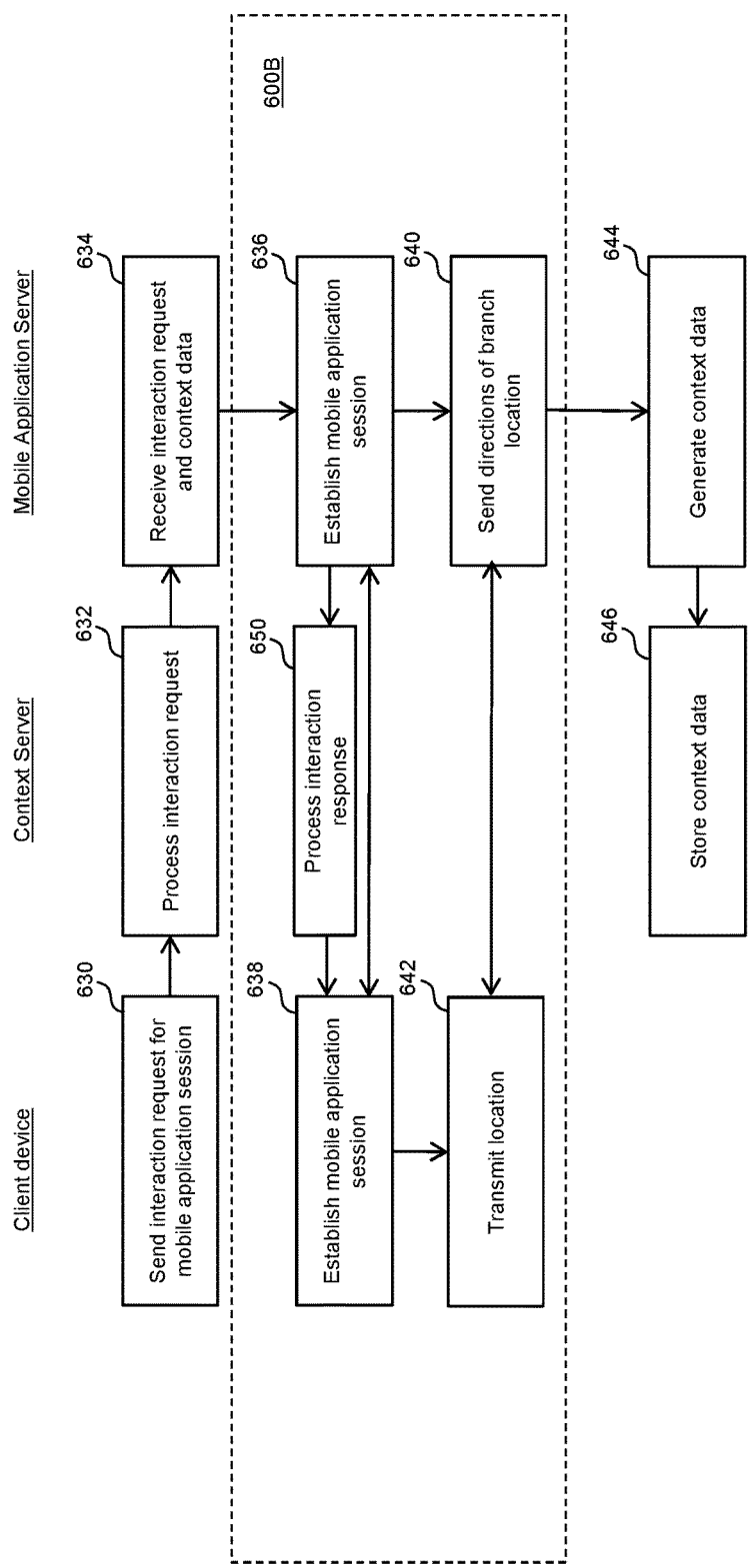
Figure 6C:
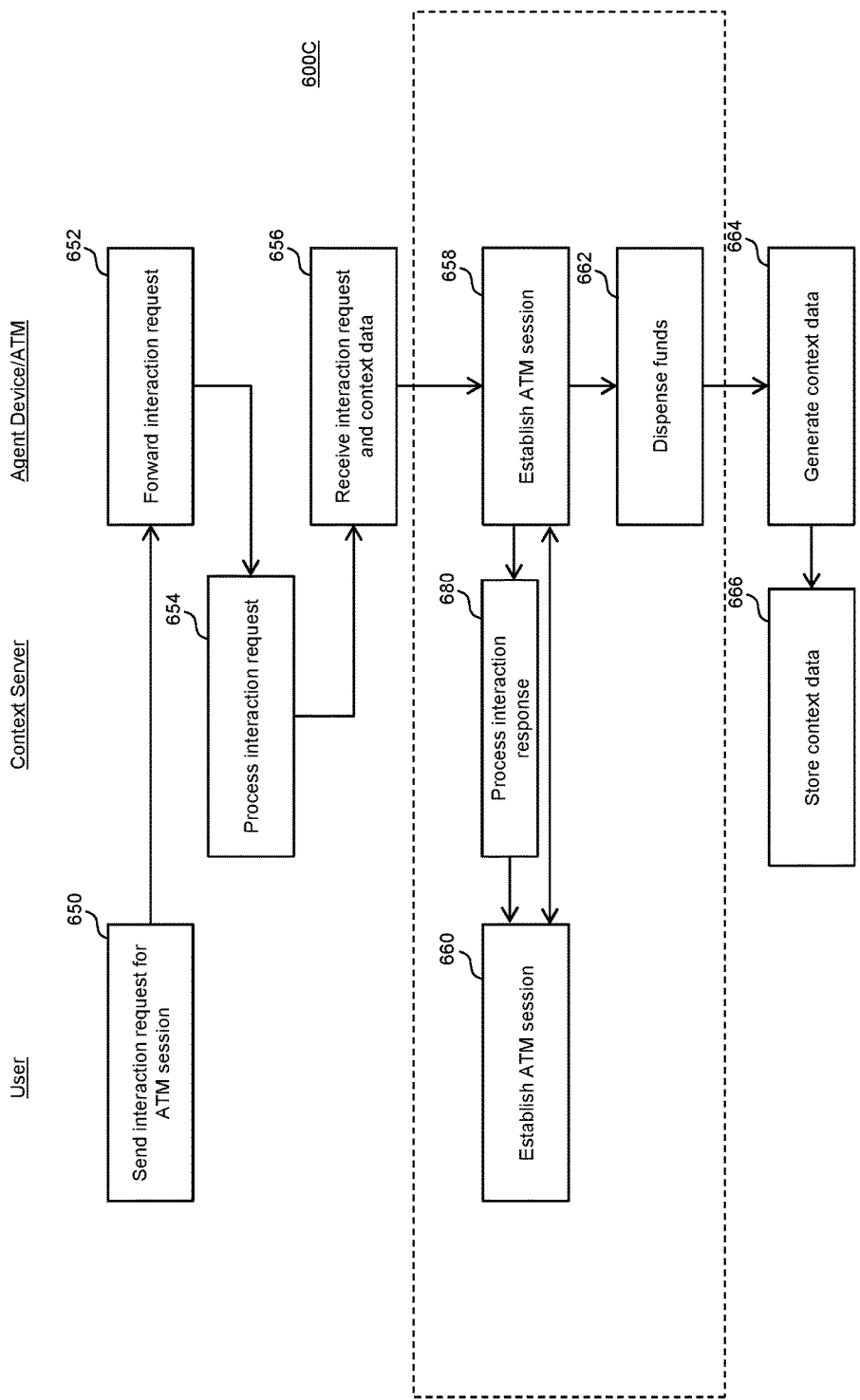

FIGS. 6A-6C illustrate computer executable instructions that can be performed in the course of example interaction sessions 600A, 600B and 600C to withdraw funds from a bank account. At block 602, client device 104 sends an interaction request for a virtual chat session 600A (i.e., using the virtual chat channel) to the context server 170 (for example, by selecting a virtual chat dialog box on the website of the bank or bank profile page on a social media website). For the sake of simplicity, in this example there are no related previous or concurrent interaction sessions at the time the interaction request for the virtual chat session 600A is made (although other unrelated interaction sessions and context data thereof may exist) and thus at block 604, context server 170 determines that there is no context data to associate with this interaction request and sends the interaction request to the social media server 146. At block 606, the social media server 146 receives the interaction request. At block 608, the social media server 146 generates an interaction response for authenticating client device 104. As noted above for the sake of simplicity, in this example there are no related previous or concurrent interaction sessions and thus at block 620, context server 170 determines that there is no context data to associate with this interaction response and sends the interaction response to client device 104 to complete the authentication process and establish the virtual chat session 600A between social media server 146 and client device 104 at blocks 608 and 610. In an example embodiment, the user 110 may be prompted at the beginning of the virtual chat session 600A to answer various security questions to authenticate the user 110 as part of the interaction response authentication procedures. At block 612, the user 110 makes a request during the virtual chat session 600A to withdraw $500 from the user's bank account. At block 614, social media server 614 receives the request and confirms that the user 110 has sufficient funds for making the withdrawal (e.g., by accessing the user's account data 202 in data storage 152). At block 616, the social media server 146 communicates with the branch server 154 to locate a branch location having sufficient funds to carry out the withdrawal and to hold such funds for the withdrawal. The branch location can be suggested by the virtual chat agent based on the location of the user 110 or client device 104, or the user 110 can select the branch location during the virtual chat session 600A, for example. At block 618, the social media server 146 generates context data of the virtual chat session 600A and sends it to the context server 170. At block 620, the context data of virtual chat session 600A is stored in the context data storage 420.

In an example embodiment, the context data of virtual chat session 600A can include: (i) a respective identifier of the user 110, client device 104, and/or virtual chat session 600A; (ii) an identifier of the interaction channel type (i.e., virtual chat); (iii) an indication/flag to indicate whether the interaction session is secure (e.g., user 110 has been authenticated during virtual chat session 600A); (iv) start and end dates/times of the virtual chat session 600A; (v) details of the transactions requested during the virtual chat session 600A (e.g., withdrawal request, including amount and branch location to be withdrawn from); and (vi) status of the transactions requested (e.g., withdrawal request is pending visit by user 110 to the branch location).

FIG. 6B illustrates an example mobile application session 600B that occurs concurrently with or after virtual chat session 600A. At block 630, client device 104 sends an interaction request for a mobile application session 600B (i.e., using the mobile application channel) to the context server 170 (for example, by loading opening the mobile banking application on the client device 104).

At block 632, the context server 170 processes the interaction request in accordance with the computer executable instructions shown in FIG. 5A. The interaction request for the mobile application session 600B is assigned an identifier of user 110. The context server 170 determines that the mobile application session 600A is associated with the withdrawal request made in virtual chat session 600A, and sends the interaction request along with the context data of virtual chat session 600A to the mobile application server 142.

In an example embodiment, the context server 170 may determine that the interaction request for the mobile application session 600B is associated with the withdrawal request of virtual chat session 600A by associating the task of any interaction session(s) that occur within a certain proximity in time to the interaction request to be the task associated with such interaction request. In this example, the withdrawal request of virtual chat session 600A is associated with the interaction request for mobile application session 600B since virtual chat session 600A occurs concurrently with or immediately prior to the interaction request for the mobile application session 600B.

Figure 7:
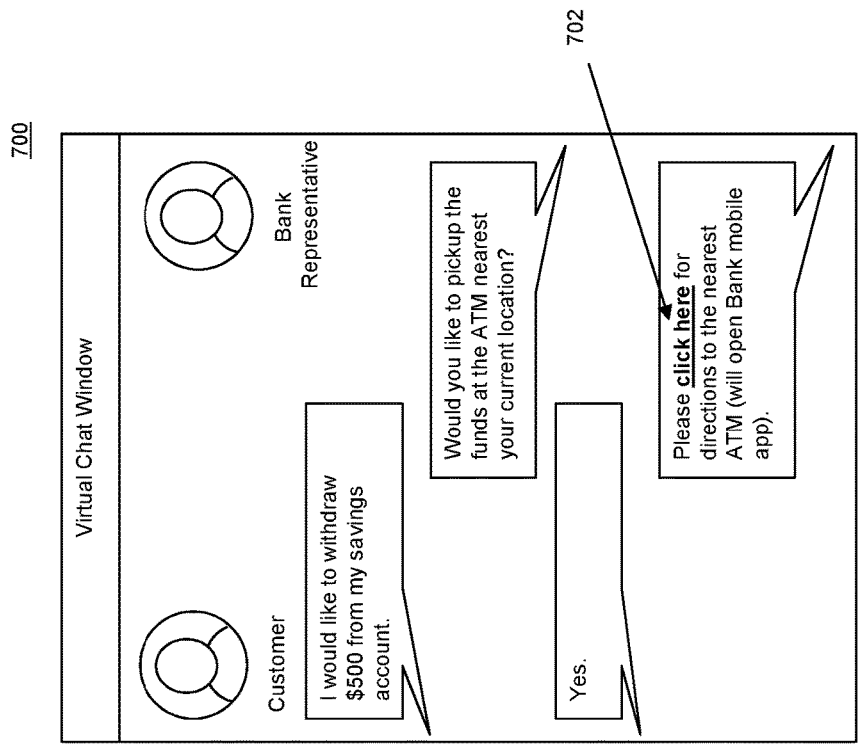
FIG. 7 is an example of a graphical user interface of a virtual chat session.

In an example embodiment, the context server 170 may determine that the interaction request for the mobile application session 600B is associated with the withdrawal request of virtual chat session 600A, by associating the task of the interaction session that initiates an interaction request to be the task associated with such interaction request. FIG. 7 illustrates an example graphical user interface 700 of a portion of the virtual chat session 600A, displayed on the client device 104 (e.g., via a display screen of the client device 104). During virtual chat session 600A, the interaction request for the mobile application session 600B is made by the user 110 selecting the link 702 to open the mobile application. Therefore, the context server 170 associates the withdrawal request of virtual chat session 600A to the interaction request for the mobile application session 600B, as the withdrawal request is also associated with the virtual chat session 600A in which the interaction request is initiated. It will be appreciated that the virtual chat functionality may be part of a website of business entity 190, a profile page of a third-party social media website, a mobile application, or another software application or website.

Referring back to FIG. 6B, at block 634, the mobile application server 142 receives the interaction request for the mobile application session 600B and the context data of virtual chat session 600A, and the client device 104 and mobile application server 142 establish the mobile application session 600B at blocks 636 and 638.

In an example embodiment, at block 636, the mobile application server 142 generates an interaction response for authenticating client device 104 in response to the interaction request and sends the interaction response to the context server 170. For example, the interaction response may be in the form of a authentication request for a login and password. At block 650, the context server 170 processes the interaction response in accordance with the computer executable instructions shown in FIG. 5B. The interaction response is assigned an identifier of user 110. The context server 170 determines that the mobile application session 600B is associated with the withdrawal request made in virtual chat session 600A (e.g., in a similar manner as previously described for block 632). The context server 170 uses the subset of the context data to detect that the user 110 has already been authenticated in virtual chat session 600A. In cases where the mobile application session 600B is initiated from within the secure virtual chat session 600A (such as FIG. 7), the context server 170 can determine this from the subset of the context data and simplify or remove the authentication request for a login and password from the interaction response such that client device 104 does not have to provide such information at block 638 to establish the mobile application session 600B. It will be appreciated that in certain example embodiments, the modifications to the interaction response can be performed by the mobile application server 142 using the subset of the context data provided with the interaction request from block 632.

At block 640, the mobile application server 142 uses the context data of the virtual chat session 600A to determine that directions to the branch nearest the location of client device 104 is to be sent. During the mobile application session 600B, client device 104 sends its location at block 642 and mobile application server 142 provide directions to the nearest branch from such location at block 640.

At block 644, the mobile application server 142 generates context data of the mobile application session 600B and sends such context data to the context server 170. At block 646, the context data of the mobile application session 600B is stored in the context data storage 420.

In an example embodiment, the context data of mobile application session 600B can include: (i) a respective identifier of the user 110, client device 104, and/or mobile application session 600B; (ii) an identifier of the interaction channel (type i.e., virtual chat); (iii) an indication/flag to indicate whether the interaction session is secure (e.g., user 110 has been authenticated during mobile application session 600B); (iv) start and end dates/times of the mobile application session 600B; (v) details of the transactions requested during the mobile application session 600B (e.g., withdrawal request, including amount and branch location to be withdrawn from, and directions thereto); (vi) status of the transactions requested (e.g., withdrawal request is pending visit by user 110 to the branch location); and (vii) any interaction sessions (and context data thereof) related to the mobile application session 600B (such as virtual chat session 600A).

FIG. 6C illustrates an example ATM session 600C that occurs concurrently with or after virtual chat session 600A and/or mobile application session 600B. At block 650, user 110 sends an interaction request for an ATM session 600C to the agent device 180 (which in this example is an ATM). At block 652, the agent device 180 forwards the interaction request to the context server 170. At block 654, the context server 170 processes the interaction request in accordance with the computer executable instructions shown in FIG. 5A. The interaction request for the ATM session 600C is assigned an identifier of user 110. The context server 170 determines that the ATM session 600C is associated with the withdrawal request of virtual chat session 600A and mobile application session 600B, and sends the interaction request along with the context data of the virtual chat session 600A and mobile application session 600B to the agent device 180. At block 656, the agent device 180 receives the interaction request for the ATM session 600C and the context data of the virtual chat session 600A and mobile application session 600B, and the user 110 and agent device 180 establish the ATM session 600C at blocks 660 and 658.

In an example embodiment, establishing the ATM session 600C at blocks 660 and 658 include authenticating the user 110. For example, authentication at the agent device 180 can be completed by having the user 110 insert a bank card into the ATM and entering a personal identification number (PIN) number. However, if another authenticated interactive session is active, the above authentication method can be bypassed and replaced with a simplified authentication method, which uses the existing active interactive session to authenticate the user 110 in the interaction session being requested.

For example, referring back to the examples of FIGS. 6A-6C, if the user 110 has been authenticated in the mobile application session 600B at blocks 638 and 636 (e.g., the user 110 entered his/her customer number and mobile app password when establishing the mobile application session 600B), then the context data of mobile application session 600B can include authentication information indicating that this session has been authenticated. In an example embodiment, ATM session 600C can then authenticate such user 110 by sending a message via the mobile application session 600B to confirm that such user is currently at the physical location of the agent device 180 (i.e., accessing the ATM).

Figure 8:
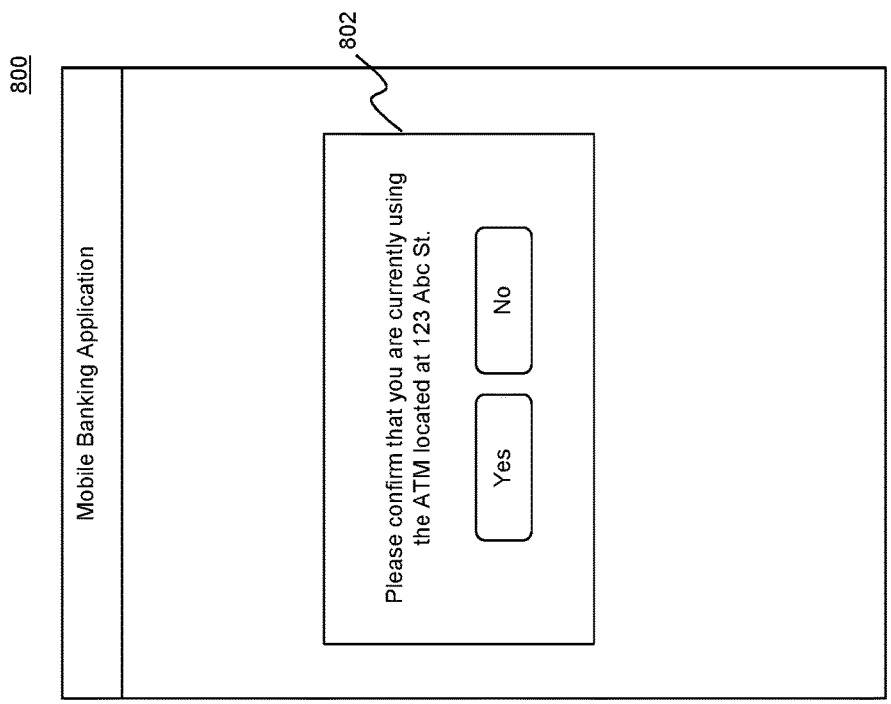
FIG. 8 is an example of a graphical user interface of an authentication message on a mobile application.

An example graphical user interface 800 of the mobile application session 600B to authenticate the user 110 is shown in FIG. 8, in which a pop-up message 802 is displayed to confirm that the user 110 is currently at the ATM of the ATM session 600C. The user 110 is authenticated in the ATM session 600C by selecting "yes" to the pop-up message 802 in the mobile application session 600B. In another example embodiment shown in FIG. 9, a pop-up message displaying a code is displayed during the mobile application session 600B which must be entered into the agent device 180 for the user 110 to be authenticated in the ATM session 600C. The above example authentication methods allow the user 110 to be authenticated without needing to memorize pins or other passwords, which may be cumbersome and difficult to keep track of.

Figure 9:
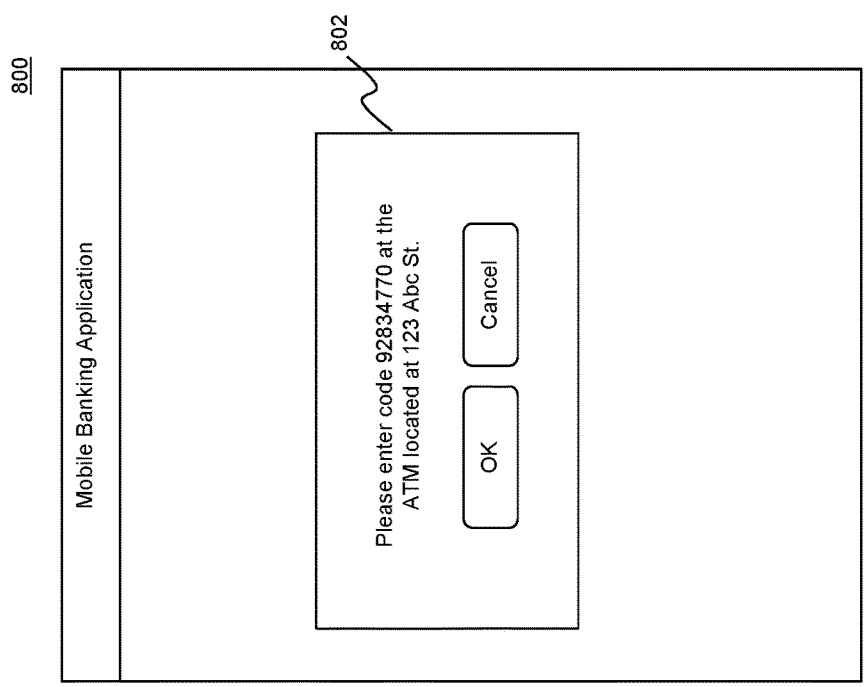
FIG. 9 is another example of a graphical user interface of an authentication message on a mobile application.

In an example embodiment, at block 658, a "default" authentication interaction response is generated by the agent device 180 to request user 110 to insert a bank card and enter a PIN number. The interaction response is sent to the context server 170 and at block 680, the context server 170 processes the interaction response in accordance with the computer executable instructions shown in FIG. 5B. The interaction response is assigned an identifier of user 110. The context server 170 determines that the ATM session 600C is associated with the withdrawal request of virtual chat session 600A and mobile application session 600B, and uses the context data associated with the withdrawal request of virtual chat session 600A and mobile application session 600B, including authentication information, to modify the "default" authentication interaction response. In the example of FIG. 8, the interaction response is modified from a requirement to insert the bank card and PIN number via the ATM to the graphical user interface and input requirement via the mobile application session 600B. In the example of FIG. 9, the interaction response is modified from interactions with solely the agent device 180 to a combination of interactions with the ATM session 600C and mobile application session 600B.

Referring back to FIG. 6, at block 662, the agent device 180 dispenses $500 to complete the withdrawal request initially made in the virtual chat session 600A. The agent device 180 uses the context data of the virtual chat session 600A to determine that there is an outstanding withdrawal of $500 by user 110. The agent device 180 uses the context data of the mobile application session 600B to determine that such outstanding withdrawal is to be completed by the ATM at this specific location. Therefore, agent device 180 dispenses $500 to complete the withdrawal request upon authenticating that the user is at the agent device 180.

At block 664, the agent device 180 generates context data of the ATM session 600C and sends it to the context server 170. At block 666, the context data of the ATM session 600C is stored in the context data storage 420.

In an example embodiment, the context data of ATM session 600C can include: (i) a respective identifier of the user 110 and/or ATM session 600C; (ii) an identifier of the interaction channel type (i.e., ATM); (iii) an indication/flag to indicate whether the interaction session is secure (e.g., user 110 has been authenticated during ATM session 600C); (iv) start and end dates/times of the ATM session 600C; (v) details of the transactions requested during the ATM session 600C (e.g., withdrawal request, including amount and branch location to be withdrawn from, and directions thereto); (vi) status of the transactions requested (e.g., withdrawal request is completed); and (vii) any interaction sessions (and context data thereof) related to the ATM session 600C (such as virtual chat session 600A and mobile application session 600B).

Figure 10A:
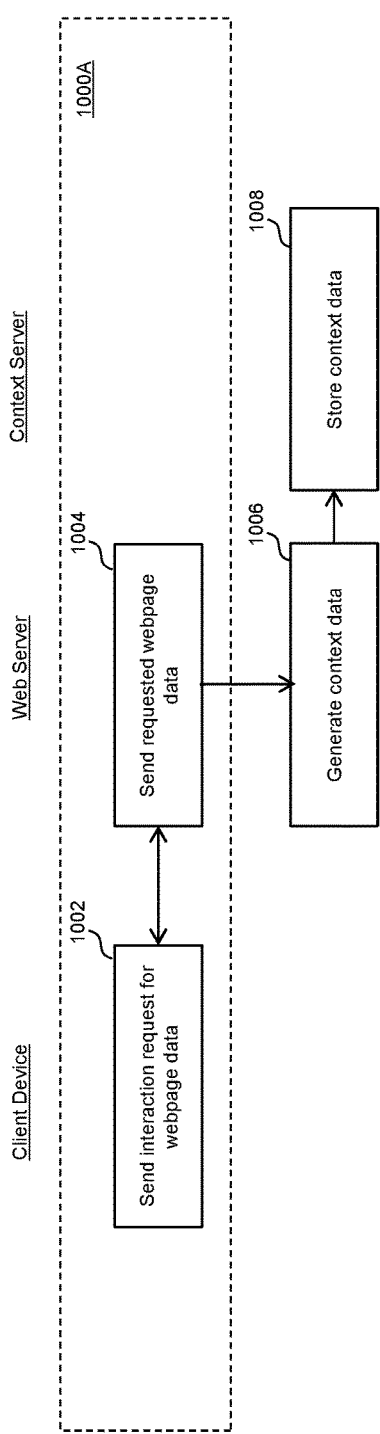
FIGS. 10A-10C are flow diagrams of examples of computer executable instructions for example interaction sessions.
Figure 10B:
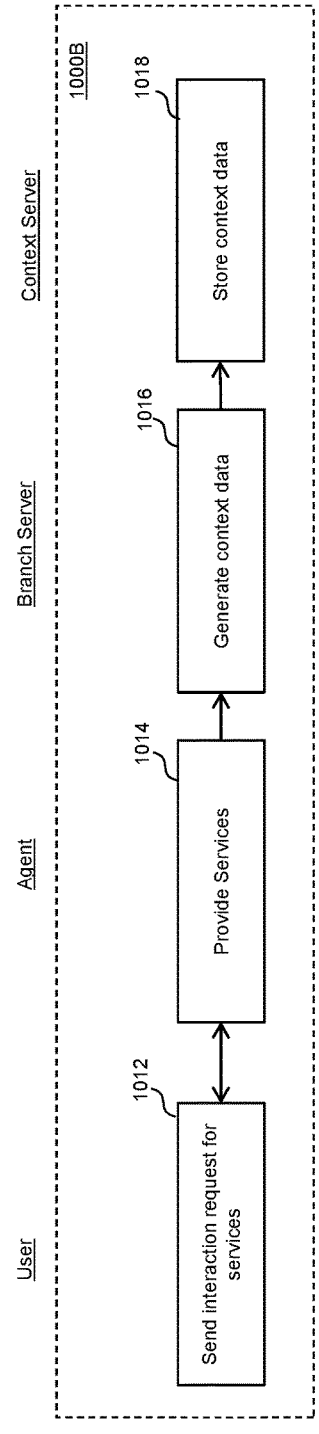
Figure 10C:
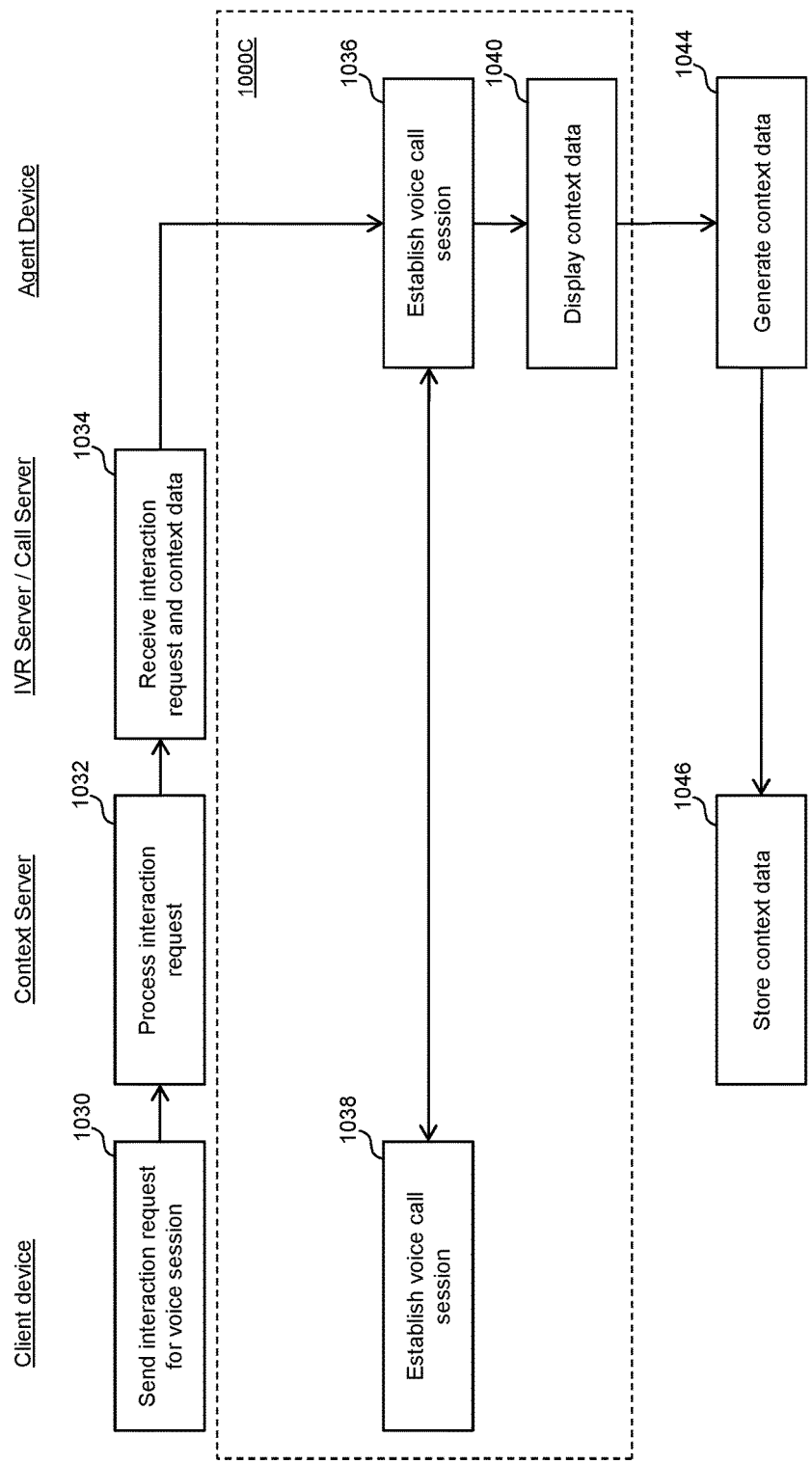
Figure 11:
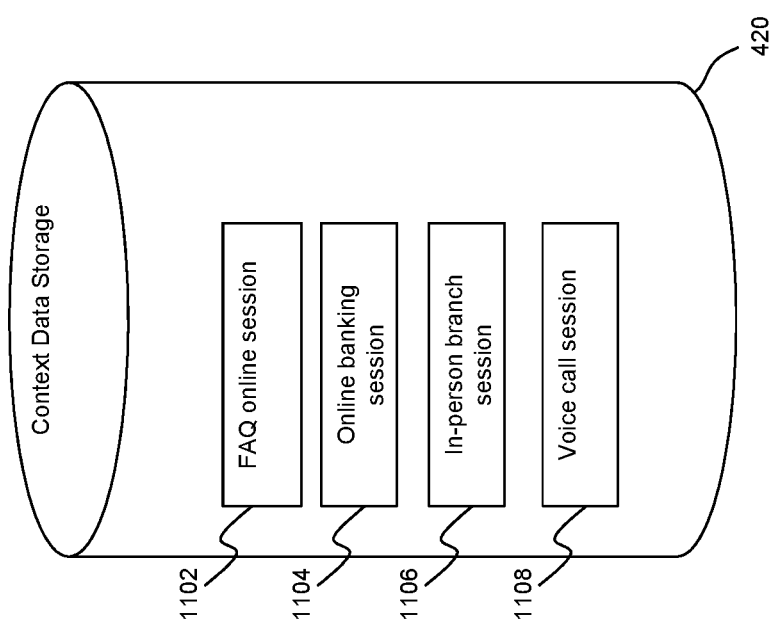
FIG. 11 is a block diagram of example data components of a context data storage.

FIGS. 10A-10C illustrate computer executable instructions that can be performed in the course of example interaction sessions 1000A, 1000B and 1000C regarding online bill payments. FIG. 11 illustrates example data that can be stored in context data storage 420 in connection with interaction sessions 1000A, 1000B and 1000C.

Referring to FIG. 10A, example computer executable instructions for conducting webpage interaction sessions 1000A is shown. At block 1002, user 110 requests access to webpage data (e.g., using an internet browser on a smartphone, laptop, desktop computer, etc.). At block 1004, web server 148 provides the requested webpage data. At block 1006, context data regarding the webpage session 1000A is generated by the context server 170, and such context data is stored at block 1008. In an example scenario, user 110 accesses the frequently asked questions (FAQ) webpage of a bank website on how to make bill payments online (i.e., an FAQ online session), and then logs into his/her online bank account to access the webpage for adding a payee to his/her online payments banking profile (i.e., an online banking session). As a result, context data 1102 for the FAQ online session and context data 1104 of the online banking session is generated and stored in context data storage 420, as shown in FIG. 11.

FIG. 10B illustrates an example in-person branch session 1000B. At block 1012, user 110 requests banking services. At block 1014, branch customer services representatives complete such services. At block 1016, branch server 154 generates context data regarding in-person branch session 1000B, and such context data is stored at 1018. In an example scenario, user 110 visits the branch to make bill payments in-person. As a result, context data 1106 of the in-person branch session is generated and stored in context data storage 420, as shown in FIG. 11.

FIG. 10C illustrates an example voice call session 1000C that can occur concurrently with or after the webpage sessions 1000A, as well as in-person branch sessions 1000B. At block 1030, the user 110 (e.g., via the client device 104) sends an interaction request for a voice call session 1000C with an agent 182. (i.e., using the telephone voice channel).

At block 1032, the context server 170 processes the interaction request in accordance with the computer executable instructions shown in FIG. 5A. The interaction request for the voice call session 1000C is assigned an identifier of user 110. The context server 170 determines that the voice call session 100C is related to the FAQ online session and online banking session, as both such sessions are active at the time the interaction request for the voice call session 1000C is detected. The context server 170 then determines that the task in common between the context data of the webpage sessions 1000A (i.e., context data 1102 of FAQ online session and context data 1104 of online banking session) is that they are directed to adding a payee to an online payments banking profile of user 110 to make bill payments online. The context server 170 then associates the context data of the webpage sessions 1000A to the interaction request for the voice call session 1000C, and sends the interaction request along with such context data to IVR server 144 and/or call server 150 to route the voice call to an agent 180 via agent device 182. At block 1036 and 1038, the agent device 182 and client device 104 establish a voice call session 1000C.

Figure 12:
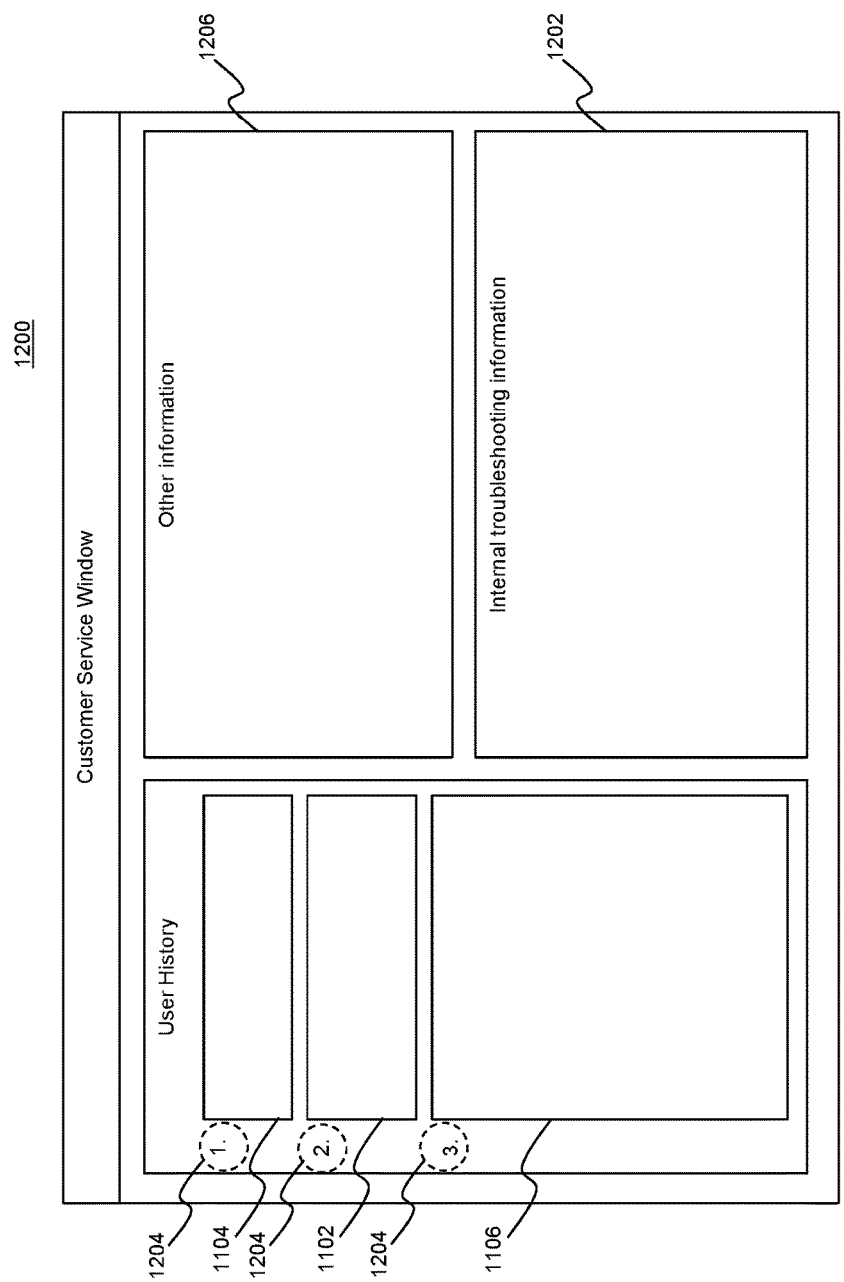
FIG. 12 is an example of a graphical user interface for a customer service application.

In an example embodiment, at block 1040, the agent device 180 displays the context data of the webpage sessions 1000A (i.e., context data 1102 of FAQ online session and context data 1104 of online banking session) or information derived thereof, for use by the agent 182. In this way, the context server 170 anticipates that the user 110 is calling to inquire about how to add a payee to make bill payments online, and provides relevant information on the history of the user 110 to the agent 182 to service the call. The context data 1102 of the FAQ online session can provide information on what information has been reviewed by the user 110 so that the agent 182 need not repeat it during the voice call session 1000C. The context data 1104 of the online banking session may indicate the history of steps that the user 110 has attempted in order to add a payee, which the Agent 182 can use to identify any errors in such steps. FIG. 12 illustrates an example graphical user interface 1200 that can be displayed on the agent device 180 for use by the agent 182.

In an example embodiment, the agent device 180 can obtain or determine other information that may be related to the task associated with the voice call session 1000C (in this example, adding a payee to an online payments banking profile), and displays such other information to the agent 182. For example, the graphical user interface 1200 of FIG. 12 can include internal troubleshooting information 1202 and other information 1206 that the agent 182 may find useful in servicing the call.

In an example embodiment, the context server 170 can determine a ranking of relevance of other interaction sessions to the current interaction request being processed, and display context data of the other interaction sessions in such ranked order. For example, the context server 170 may determine that the context data 1104 of the online banking session in which the user 110 attempted to add a payee is the most relevant information to the agent 182 in assisting the user 110 in successfully adding a payee, followed by the context data 1102 of the FAQ webpage session. The context server 170 may also determine that context data 1106 of in-person branch sessions in which bills were paid may also be relevant (e.g., because one of such payees may be the party for which the user 110 is trying to add to his/her online payments banking profile) but display it on the graphical user interface 1200 at a lower ranking, as shown by the enumerations 1204 in FIG. 12.

At block 1044, the agent device 180 generates context data 1108 of voice call session 1000C and sends it to the context server 170. At block 1046, the context data 1108 of voice call session 1000C is stored in the context data storage 420 for future use.

In an example embodiment, the artificial intelligence server 190 may be used to perform various operations discussed herein using artificial intelligence to automate operations, make selections and generate messages such as interaction responses. "Artificial intelligence" is used herein to broadly describe any computationally intelligent systems that combine knowledge, techniques, and methodologies. An artificial intelligence server 190 may be any system configured to apply knowledge data (e.g., dynamic decision making models and techniques) and that can adapt itself in changing environments and update or generate new knowledge data based on such environments. Therefore, the artificial intelligence server 190 may employ any one or combination of computational techniques related to achieving artificial intelligence, such as natural language processing, machine learning, neural networks, statistical techniques, constraint programs, fuzzy logic, classifications, symbolic manipulations, fuzzy set theory, evolutionary computations, cybernetics, data mining, approximate reasoning, search and optimizations, decision trees, soft computing, etc. Employing computationally intelligent techniques, the artificial intelligence server 190 may learn to adapt to new or changing environment for better performance.

Figure 13:
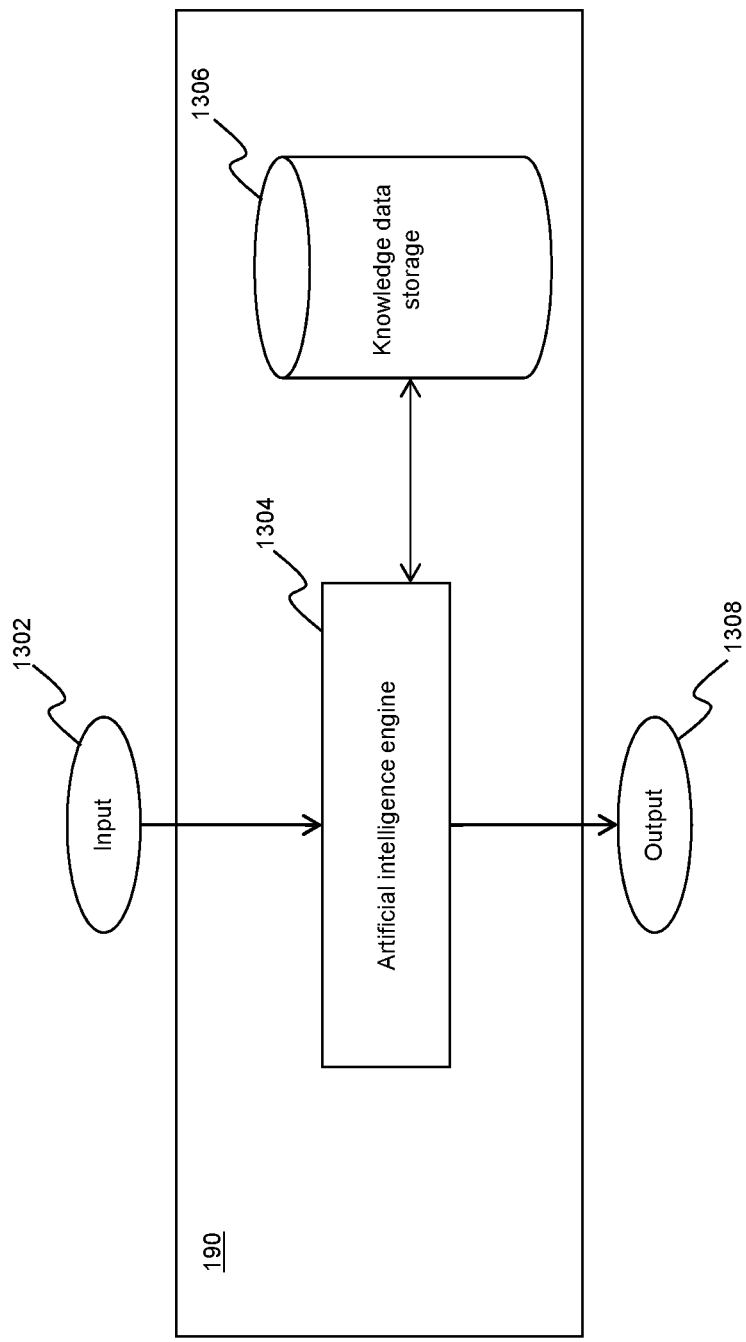
FIG. 13 is a block diagram of an example configuration of an artificial intelligence server.

In FIG. 13, an example configuration of an artificial intelligence server 190 is shown. The artificial intelligence server 190 receives input 1302 and generates output 138, and includes an artificial intelligence engine 1304 and a knowledge data storage 1306.

The artificial intelligence server 190 can receive input 1302 from one or more component of system 140, such as the context server 170. The input 1302 may include any data accessible to system 140, including input requests, input responses and/or context data associated with one or more interaction sessions.

The artificial intelligence engine 1304 can generate an output 1308 based on the input 1304 and knowledge data stored in the knowledge data storage 1306, using artificial intelligence. Knowledge data may represent any information upon which the artificial intelligence engine 1304 may determine an appropriate output 1308 to input 1302. Knowledge data may represent, for example, relationship information between a user 110, a task, an interaction request, an interaction response, context data of one or more interaction sessions, and/or an operation to be performed in an interaction session.

In an example embodiment, the artificial intelligence engine 1304 may be trained based on any data accessible in system 140, such as previous interaction requests, interaction responses and context data associated with one or more interaction sessions, to generate the knowledge data. The training set of data can be limited to data associated with a particular user 110 or client device 104 participating in a specific interaction session. In another example embodiment, the training set of data can include other data accessible to the artificial intelligence engine 1304, such as context data of interaction sessions involving other users 110 and client devices 104 not participating in the specific interaction session to which the input 1302 may relate.

In an example embodiment, the training process of the artificial intelligence engine 1304 to generate the knowledge data can be iterative. Training may be based on a wide variety of learning rules or training algorithms. For example, the learning rules may include one or more of the following: back-propagation, real-time recurrent learning, pattern-by-pattern learning, supervised learning, interpolation, weighted sum, reinforced learning, temporal difference learning, unsupervised learning, recording learning, etc. As a result of the training, the artificial intelligence engine 1304 may learn to modify its behavior in response to its environment, and generate new or updated knowledge data to be stored in knowledge data storage 1306.

For example, in processing an interaction request, the artificial intelligence engine 1304 may associate the task of the interaction request and the subset of the context data with an interaction response. This association can then be stored as part of the knowledge data storage 1306 for use when processing a subsequent interaction request to determine a subsequent interaction response. In processing an interaction request, the artificial intelligence engine 1304 may detect that the task and the subset of the context data are associated with a previous interaction response, and then generate an interaction response based on the previous interaction response.

Since the artificial intelligence engine 1304 may learn to modify its behavior, information describing relationships for a universe of all combinations of interaction responses, interaction requests, and context data of interaction sessions may not need to be maintained by the artificial intelligence server 190.

Figure 14:
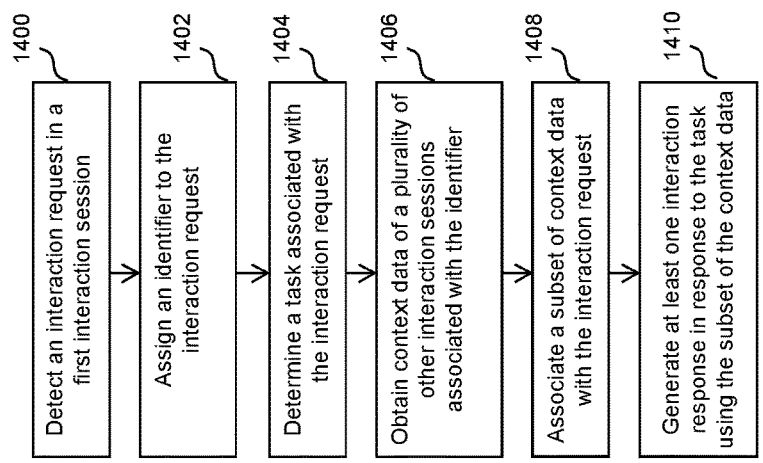
FIG. 14 is a flow diagram of another example of computer executable instructions for processing an interaction request.

Referring to FIG. 14, another example embodiment of computer executable instructions for processing an interaction request is shown. In an example embodiment, the instructions can be executed by the servers of system 140. At block 1400, the interaction detector module 410 detects an interaction request in an interaction session using an interaction channel. At block 1402, the identifier assignment module 412 assigns an identifier to the interaction request. At block 1404, the task determination module 414 determines a task associated with the interaction request. At block 1406, the context server 170 obtains context data (e.g., from the context data storage 420) of other interaction sessions associated with the identifier that is related to the activity of user 110. At block 1408 the context selection module 416 selects a subset of the context data from the context data available to the context server 170 (e.g., stored in context data storage 420) and associates such context data with the interaction request. The interaction request and associated subset of the context data can then be sent to the artificial intelligence server 190. At block 1410, the artificial intelligence engine 1304 of the artificial intelligence server 190 can use the subset of the context data to generate at least one interaction response in response to the task associated with the interaction request. It will be appreciated that the description of blocks 502, 504, 506 and 508 may apply in a similar manner to blocks 1402, 1404, 1406 and 1408, respectively.

Figure 15:
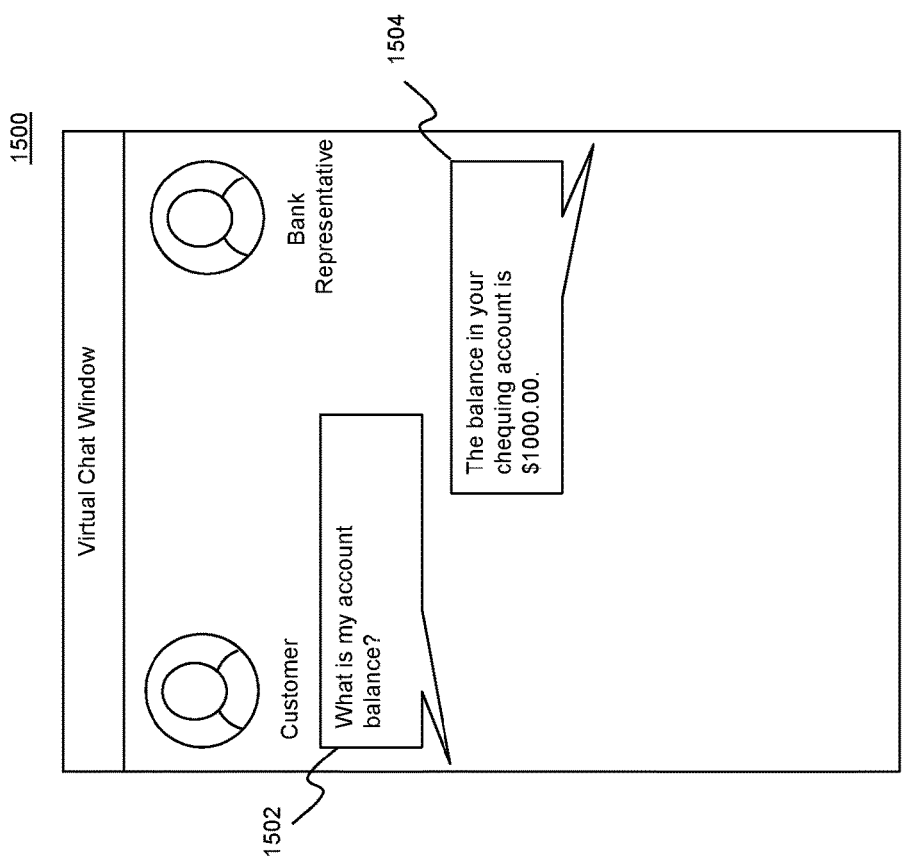
FIG. 15 is another example of a graphical user interface of a virtual chat session.

In an example embodiment, an interaction request detected at block 1400 may be a communication message in an interaction session that has already been established. For example, user 110 may be participating in a virtual chat session shown in an example graphical user interface 1500 of client device 104 (FIG. 15). User 110 may send an interaction request 1502 in the form of virtual chat message to request an account balance. In this example, the message 1502 is detected at block 1400. At block 1402, the message 1502 is assigned an identifier associated with user 110 (e.g., a unique user identification number of user 110). At block 1404, the task of providing the balance of an account associated with the user identification number is determined. In an example scenario, the user identification number may be associated with several accounts in data storage 152 (e.g., a chequing account, savings account, and credit card account). At blocks 1406 and 1408, context data associated with other interaction sessions that have recently updated the balance of the accounts of user 110 or that have queried the balance of such accounts are associated with the interaction request, and such context data and the interaction request is sent to the artificial intelligence server 190.

In an example embodiment, at block 1410, the artificial intelligence server 190 may determine using the subset of the context data and the knowledge data that the user 110 is likely only interested in the balance of its chequing account. For example, the subset of the context data may indicate that the chequing account balance is often queried by user 110, whereas the other account balances are not queried or only done so through interaction sessions using a different type of interaction channel than the virtual chat session. In this example, at block 1410, the artificial intelligence server 190 may generate an interaction response 1504 in the form of a virtual chat message providing the balance of the chequing account of user 110, and automatically send the interaction response 1504 to user 110 via the virtual chat session.

In another example embodiment, at block 1410, the artificial intelligence server 190 may determine using the subset of the context data and the knowledge data that the user 110 may be interested in the balance of more than one account. For example, the subset of the context data may indicate that the balance of the chequing account and credit card account of user 110 are often queried by user 110 through virtual chat sessions. In this example, at block 1410, the artificial intelligence server 190 may generate an interaction response in the form of a list of suggested responses (e.g., a first suggested response being the balance of the chequing account, and a second suggested response being the balance of the credit card account), and send such suggested responses to an agent device 180 for selection by an agent 182 (e.g., bank employee) servicing the virtual chat session as the bank representative. For example, the list of suggested responses can be displayed to the agent 182 as other information 1206 in the example graphical user interface 1200 of FIG. 12. In another example embodiment, the artificial intelligence server 190 may generate an interaction response in the form of a virtual chat message listing the balance of multiple accounts (not shown in FIG. 15).

In another example embodiment, at block 1410, the artificial intelligence server 190 may, having determined using the subset of the context data and the knowledge data that the user 110 may be interested in the balance of more than one account, further determine the appropriate interaction response to be to request further information for the user 110. In this example, at block 1410, the artificial intelligence server 190 may generate an interaction response 1604 in the form of a virtual chat message requesting the user 110 specify the account for which the interaction request 1502 relates, and automatically send the interaction response 1604 to user 110 via the virtual chat session (see FIG. 16).

From the above examples, it can be seen that the artificial intelligence server 190 may assist an agent 182 by providing suggested interaction responses in response to interaction requests. In an example embodiment, the artificial intelligence server 190 can generate interaction responses to be automatically sent to the request initiator of the interaction session, without input from a human agent 182.

It will be appreciated that the artificial intelligence server 190 may be incorporated into a single computer or a single server or service, or alternatively, may be distributed among one or more computing systems 300. In an example embodiment, one or more servers or devices of system 140 may have its own respective artificial intelligence server 190 or implement its own respective artificial intelligence engine 1304, such as agent device 180 to implement an automated bot agent 182.

It will be appreciated that the artificial intelligence server 190 may also be used in certain example embodiments to perform the tasks and operations described herein, including blocks 504, 508, 510, 534, 538, 540, 1404, 1408 and 1410.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the spirit of the invention or inventions. For instance, the steps may be performed in a differing order, or steps may be added, deleted, or modified.

Although the above has been described with reference to certain specific examples, various modifications thereof will be apparent to those skilled in the art as outlined in the appended claims.

The invention claimed is:

1. A device for processing an interaction response of a request service provider, the device comprising a processor and memory, the memory storing computer executable instructions that when executed by the processor cause the processor to:
   detect the interaction response for a first interaction session using a first interaction channel between a request initiator and the request service provider;
   assign an identifier to the interaction response;
   determine a task associated with the interaction response;
   obtain context data of a plurality of other interaction sessions associated with the identifier, the plurality of other interaction sessions occurring proximal in time with the first interaction session, the context data being related to activity of the request initiator;

assign weighting values to the context data of the plurality of other interaction sessions based on interaction channel type;

associate a subset of the context data with the interaction response, the subset of the context data being the context data of the plurality of other interaction sessions that are related to the task, wherein the subset of the context data comprises the context data of the plurality of other interaction sessions satisfying a weighting threshold value; and modify the interaction response using the subset of the context data.

2. The device of claim 1, wherein modifying the interaction response comprises translating the interaction response for transmission in one of the plurality of other interaction sessions that uses an interaction channel different from the first interaction channel.

3. The device of claim 1, wherein modifying the interaction response comprises translating the interaction response for transmission in a new interaction session that uses an interaction channel different from the first interaction channel.

4. The device of claim 1, wherein modifying the interaction response comprises updating data of the interaction response to be consistent with other data transmitted to the request initiator in one of the plurality of other interaction sessions.

5. The device of claim 1, wherein the plurality of other interaction sessions comprises other interaction sessions initiated within a predetermined time preceding detecting the interaction response.

6. The device of claim 1, wherein the plurality of other interaction sessions comprises other interaction sessions active at a time of detecting the interaction response.

7. The device of claim 1, wherein each of the plurality of other interaction sessions and the first interaction session use different types of interaction channels and the context data of each of the plurality of other interaction sessions comprises an identifier of the type of interaction channel used.

8. The device of claim 1, wherein the device comprises a context server in communication with a request initiator device and a request service provider device.

9. A method of processing an interaction response of a request service provider, the method comprising:

detecting the interaction response for a first interaction session using a first interaction channel between a request initiator and the request service provider;

assigning an identifier to the interaction response;

determining a task associated with the interaction response;

obtaining context data of a plurality of other interaction sessions associated with the identifier, the plurality of other interaction sessions occurring proximal in time with the first interaction session, the context data being related to activity of the request initiator;

assigning weighting values to the context data of the plurality of other interaction sessions based on interaction channel type;

associating a subset of the context data with the interaction response, the subset of the context data being the context data of the plurality of other interaction sessions that are related to the task, wherein the subset of the context data comprises the context data of the plurality of other interaction sessions satisfying a weighting threshold value; and modifying the interaction response using the subset of the context data.

10. The method of claim 9, wherein modifying the interaction response comprises translating the interaction response for transmission in one of the plurality of other interaction sessions that uses an interaction channel different from the first interaction channel.

11. The method of claim 9, wherein modifying the interaction response comprises translating the interaction response for transmission in a new interaction session that uses an interaction channel different from the first interaction channel.

12. The method of claim 9, wherein modifying the interaction response comprises updating data of the interaction response to be consistent with other data transmitted to the request initiator in one of the plurality of other interaction sessions.

13. The method of claim 9, wherein the plurality of other interaction sessions comprises other interaction sessions initiated within a predetermined time preceding detecting the interaction response.

14. The method of claim 9, wherein the plurality of other interaction sessions comprises other interaction sessions active at a time of detecting the interaction response.

15. The method of claim 9, wherein each of the plurality of other interaction sessions and the first interaction session use different types of interaction channels and the context data of each of the plurality of other interaction sessions comprises an identifier of the type of interaction channel used.

16. A non-transitory computer readable medium for processing an interaction response of a request service provider, the computer readable medium comprising computer executable instructions for:

detecting the interaction response for a first interaction session using a first interaction channel between a request initiator and the request service provider;

assigning an identifier to the interaction response;

determining a task associated with the interaction response;

obtaining context data of a plurality of other interaction sessions associated with the identifier, the plurality of other interaction sessions occurring proximal in time with the first interaction session, the context data being related to activity of the request initiator;

assigning weighting values to the context data of the plurality of other interaction sessions based on interaction channel type;

associating a subset of the context data with the interaction response, the subset of the context data being the context data of the plurality of other interaction sessions that are related to the task, wherein the subset of the context data comprises the context data of the plurality of other interaction sessions satisfying a weighting threshold value; and modifying the interaction response using the subset of the context data.

17. The non-transitory computer readable medium of claim 16, wherein modifying the interaction response comprises translating the interaction response for transmission in one of the plurality of other interaction sessions that uses an interaction channel different from the first interaction channel.

18. The non-transitory computer readable medium of claim 16, wherein modifying the interaction response comprises updating data of the interaction response to be consistent with other data transmitted to the request initiator in one of the plurality of other interaction sessions.

* * * * *